US005930445A

United States Patent [19]

Peters et al.

[11] Patent Number: 5,930,445
[45] Date of Patent: Jul. 27, 1999

[54] ELECTRONIC FILM EDITING SYSTEM USING BOTH FILM AND VIDEOTAPE FORMAT

[75] Inventors: Eric C. Peters, Carlisle; Patrick D. O'Connor, Framingham; Michael E. Phillips, Brookline, all of Mass.

[73] Assignee: Avid Technology, Inc., Tewksbury, Mass.

[21] Appl. No.: 08/393,877

[22] Filed: Feb. 24, 1995

Related U.S. Application Data

[62] Division of application No. 07/908,192, Jul. 1, 1992, abandoned.

[51] Int. Cl.$^6$ .............................. H04N 5/93; H04N 3/36; H04N 5/253; G11B 27/00
[52] U.S. Cl. ............................... 386/52; 386/4; 386/131; 386/55; 348/97
[58] Field of Search .................................... 358/335, 346, 358/311, 343, 345, 452; 348/96–100; 345/327–328; 360/32, 27, 13, 14.1, 69, 73.01; 386/4, 52, 54, 55, 61, 65, 131

[56] References Cited

U.S. PATENT DOCUMENTS

| | | |
|---|---|---|
| 2,927,154 | 3/1960 | Wolfe et al. . |
| 3,184,542 | 5/1965 | Horsley . |
| 3,740,463 | 6/1973 | Youngstrom et al. . |

(List continued on next page.)

FOREIGN PATENT DOCUMENTS

| | | |
|---|---|---|
| 0 113 993 | 7/1984 | European Pat. Off. . |
| 0 438 299 A2 | 7/1991 | European Pat. Off. . |
| 0473322 | 3/1992 | European Pat. Off. . |
| 0481446 | 4/1992 | European Pat. Off. . |
| 473 322 A1 | 4/1992 | European Pat. Off. . |
| 0 515 031 A2 | 11/1992 | European Pat. Off. . |
| 3925046 | 1/1991 | Germany . |
| 2 235 815 | 3/1991 | United Kingdom . |
| WO 91/06182 | 5/1991 | WIPO . |
| WO 93/21588 | 10/1993 | WIPO . |

OTHER PUBLICATIONS

Conversation with Larry Seehorn, "The Midas Touch," Videography Journal, May 1989, pp. 78–81.
Seehorn Technologies Inc., "*Midas II,*" nine–page brochure, Oct. 1988.
"*Editdroid—The Editing System of Choice,*" six–page brochure, 1985.
Peters, Eric C. "*Real Time, Object Oriented, Non–Linear Editing System for Film and Video,*" presented at 131st SMPTE Technical Conference, Los Angeles, California, Oct. 21–25, 1989, preprint No. 131–91.
Avid Technology, *Media Match: A Guide to Film–Tape Transfer,* 1991.
Ohanian, Thomas A. "*Digital Nonlinear Editing,*" Boston: Focal Press 1993, i–vii, pp. 87–94 and 317–330.
Mark J. Norton, "A Visual EDL System".
Frank Davidoff, "The All–Digital Television Studio", SMPTE Journal, Jun. 1980, vol. 89, No. 6.
Milt Leonard, "Silcon Solution Merges Video, Stills, and Voice", Electronic Design, Apr. 2, 1992.

(List continued on next page.)

*Primary Examiner*—Douglas W. Olms
*Assistant Examiner*—David R Vincent
*Attorney, Agent, or Firm*—Wolf, Greenfield & Sacks, P.C.

[57] ABSTRACT

A system for generating a digital representation of a video signal comprised of a sequence of video frames which each include two video fields of a duration such that the video plays at a first prespecified rate of frames per second. The sequence of video frames includes a prespecified number of redundant video fields. Redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

52 Claims, 7 Drawing Sheets

U.S. PATENT DOCUMENTS

| | | |
|---|---|---|
| 3,748,381 | 7/1973 | Strobele et al. . |
| 3,824,336 | 7/1974 | Gould et al. . |
| 3,925,815 | 12/1975 | Lemelson . |
| 4,040,098 | 8/1977 | Beeson et al. . |
| 4,100,607 | 7/1978 | Skinner . |
| 4,179,712 | 12/1979 | Opelt . |
| 4,213,163 | 7/1980 | Lemelson . |
| 4,283,745 | 8/1981 | Kuper et al. . |
| 4,295,154 | 10/1981 | Hata et al. . |
| 4,390,904 | 6/1983 | Johnston et al. . |
| 4,413,289 | 11/1983 | Weaver et al. . |
| 4,500,908 | 2/1985 | Mandeberg . |
| 4,538,188 | 8/1985 | Barker et al. . |
| 4,567,532 | 1/1986 | Baer et al. . |
| 4,612,569 | 9/1986 | Ichinose . |
| 4,675,755 | 6/1987 | Baumeister et al. . |
| 4,685,003 | 8/1987 | Westland . |
| 4,689,683 | 8/1987 | Efron . |
| 4,698,682 | 10/1987 | Astle . |
| 4,709,277 | 11/1987 | Ninomiya et al. ............... 360/14.3 |
| 4,746,994 | 5/1988 | Ettlinger . |
| 4,750,050 | 6/1988 | Belmares-Sarabia et al. . |
| 4,752,834 | 6/1988 | Koombes . |
| 4,754,342 | 6/1988 | Duffy . |
| 4,755,889 | 7/1988 | Schwartz . |
| 4,777,537 | 10/1988 | Ueno et al. . |
| 4,785,349 | 11/1988 | Keith et al. . |
| 4,786,979 | 11/1988 | Claus et al. ............... 358/335 |
| 4,792,864 | 12/1988 | Watanabe et al. . |
| 4,823,285 | 4/1989 | Blancato . |
| 4,837,638 | 6/1989 | Fullwood . |
| 4,841,503 | 6/1989 | Yamada et al. . |
| 4,864,429 | 9/1989 | Eigeldinger et al. . |
| 4,879,611 | 11/1989 | Fukui et al. . |
| 4,891,715 | 1/1990 | Levy . |
| 4,901,161 | 2/1990 | Giovanella . |
| 4,918,523 | 4/1990 | Simon et al. . |
| 4,935,816 | 6/1990 | Faber . |
| 4,937,685 | 6/1990 | Barker et al. . |
| 4,949,193 | 8/1990 | Kiesel . |
| 4,964,004 | 10/1990 | Barker . |
| 4,969,042 | 11/1990 | Houtman et al. . |
| 4,970,663 | 11/1990 | Bedell et al. . |
| 4,972,274 | 11/1990 | Becker et al. . |
| 4,974,178 | 11/1990 | Izeki et al. . |
| 4,979,050 | 12/1990 | Westland et al. . |
| 4,989,191 | 1/1991 | Kuo . |
| 5,006,939 | 4/1991 | Cawley . |
| 5,045,940 | 9/1991 | Peters et al. ............... 358/14.3 |
| 5,099,337 | 3/1992 | Cury . |
| 5,109,482 | 4/1992 | Bohrman . |
| 5,115,311 | 5/1992 | Jaqua ............... 358/140 |
| 5,119,188 | 6/1992 | McCalley et al. . |
| 5,121,470 | 6/1992 | Trautman . |
| 5,124,807 | 6/1992 | Dunlap et al. . |
| 5,138,440 | 8/1992 | Radice . |
| 5,138,459 | 8/1992 | Roberts et al. . |
| 5,140,414 | 8/1992 | Mowry ............... 358/81 |
| 5,191,427 | 3/1993 | Richards et al. ............... 358/214 |
| 5,192,999 | 3/1993 | Graczyk et al. . |
| 5,206,929 | 4/1993 | Langford et al. . |
| 5,218,672 | 6/1993 | Morgan et al. ............... 395/162 |
| 5,231,501 | 7/1993 | Sakai . |
| 5,233,453 | 8/1993 | Funahashi et al. . |
| 5,255,083 | 10/1993 | Capitant et al. ............... 358/527 |
| 5,260,787 | 11/1993 | Capitant et al. ............... 358/140 |
| 5,262,877 | 11/1993 | Otsuka . |
| 5,267,351 | 11/1993 | Reber et al. . |
| 5,283,819 | 2/1994 | Glick et al. ............... 379/90 |
| 5,321,500 | 6/1994 | Capitant et al. ............... 348/97 |
| 5,374,954 | 12/1994 | Mowry ............... 348/121 |
| 5,384,667 | 1/1995 | Beckwith . |
| 5,388,197 | 2/1995 | Rayner ............... 395/154 |
| 5,390,028 | 2/1995 | Kobayashi et al. . |
| 5,406,326 | 4/1995 | Mowry ............... 348/104 |
| 5,412,773 | 5/1995 | Carlucci et al. ............... 395/156 |
| 5,457,491 | 10/1995 | Mowry ............... 348/104 |
| 5,459,529 | 10/1995 | Searby et al. . |
| 5,506,932 | 4/1996 | Holmes et al. . |
| 5,565,998 | 10/1996 | Coombs et al. ............... 386/46 |

OTHER PUBLICATIONS

P. Venkat Rangan, Harric M. Vin, Kashun Chan and Ingyar A. Aaberg, "A Window–Based Editor For Digital Video and Audio", 1992 IEEE, pp. 640–648.

Charles A. Pantuso, "Reducing Financial Aliasing in HDTV Production", Better Video Images, 23rd Annual SMPTE Television Conference in San Francisco, CA, Feb. 3–4, 1989.

S. Dickson & B. Villarreal, "The Gemini Process: A Theatrical–Quality Video–to–Film Transfer Process", Better Video Images, 23rd Annual SMPTE Televison Conference, Feb. 1989, San Francisco, CA, pp. 30–35.

M. Kary, "Video–Assisted Film Editing System", SMPTE Journal, Jun. 1982, pp. 547–551.

C.A. Pantuso, "Reducing financial aliasing in HDTV production", Better Video Images, 23rd Annual SMPTE Conference, Feb. 3–4, 1989, San Francisco, CA, pp. 157–169.

W. Paik, "Digicipher tm–all digital, channel compatible, HDTV broadcast system", IEEE Transactions on Broadcasting, vol. 36, No. 4 Dec. 1990, (New York, US), pp. 245–254.

P. Krieg, "Multimedia–Computer und die Zukunft des Film/ Videoschnitts", FKT Fernseh—und Kino–Technik, vol. 45, No. 5, 1991, (Heidelberg, DE), pp. 252–258 (No Translation).

Becker, Stanley D., "Stimultaneous Release On Film and Tape OFF–LINE EDLs", Nov. 1988, BME.

FIG. 4

| RECORD N° | EVENT | CAMROLL | SOUNDROLL | OOP | SCENE | TAKE | VTTC_IN | VTTC_OUT | DURATION |
|---|---|---|---|---|---|---|---|---|---|
| 1 | 0 | | | | / | / | | | 00:00:00 |
| 2 | 1 | A10 | | 05/28/92 | 87 | 1 | 04:00:05:25 | 04:01:23:25 | 01:18:00 |
| 3 | 2 | A10 | | 05/28/92 | 87A | 1 | 04:01:24:00 | 04:03:05:05 | 01:41:05 |
| 4 | 3 | A10 | | 05/28/92 | 87A | 4 | 04:03:07:11 | 04:03:26:06 | 00:18:25 |
| 5 | 4 | A12 | 16 | 05/28/92 | A51 | 5 | 04:03:26:13 | 04:04:48:09 | 01:21:26 |
| 6 | 5 | A12 | | 05/28/92 | A51 | 3 | 04:04:51:01 | 04:05:03:26 | 00:12:25 |
| 7 | 8 | A11 | | 05/28/92 | 57 | 5 | 04:06:41:08 | 04:07:00:05 | 00:18:27 |
| 8 | 9 | A11 | 15 | 05/28/92 | 57 | 6 | 04:08:05:14 | 04:09:27:10 | 01:21:26 |
| 9 | 10 | A11 | 15 | 05/28/92 | 57 | 8 | 04:11:02:09 | 04:12:20:08 | 01:17:29 |
| 10 | 11 | A15 | | 05/28/92 | 68 | 2 | 04:14:26:05 | 04:15:44:06 | 00:00:00 |
| 11 | 12 | A15 | 16 | 05/28/92 | 91 | 3 | 04:16:41:13 | 04:18:03:14 | 00:00:00 |
| 12 | 13 | A15 | 16 | 05/28/92 | 32 | 7 | 04:20:14:06 | 04:21:19:14 | 00:00:00 |

| RECORD N° | NAGRA_IN | VTTC_DROP | NAGRA_DROP | KEYIN | KEYOUT | PULLIN | PULLOUT FC |
|---|---|---|---|---|---|---|---|
| 1 | | .F. | .F. | | | | |
| 2 | | .F. | .F. | KJ158165032812 | KJ158165044512 | AA | AA |
| 3 | | .F. | .F. | KJ158165044600 | KJ158165059712 | AA | AA |
| 4 | | .F. | .F. | KJ158165060101 | KJ158165062905 | BB | BB |
| 5 | 16:12:18:13 | .F. | .F. | KJ058204062910 | KJ058204075207 | CC | DD |
| 6 | | .F. | .F. | KJ058204075609 | KJ058204077513 | BB | BB |
| 7 | | .F. | .F. | KJ058171092114 | KJ058171095004 | CC | AA |
| 8 | 16:48:50:01 | .F. | .F. | KJ058171104803 | KJ058171117100 | DD | AA |
| 9 | 10:30:47:24 | .F. | .F. | KJ058171914707 | KJ058171926406 | DD | CC |
| 10 | | .F. | .F. | KJ058171945304 | KJ058171957005 | AA | BB |
| 11 | 10:45:13:13 | .F. | .F. | KJ058171965602 | KJ058171977903 | CC | DD |
| 12 | 13:35:25:07 | .F. | .F. | KJ058171997505 | KJ058171001303 | BB | DD |

| | NAME | TRACKS | START | KN START | END | KN END | DURATION |
|---|------|--------|-------|----------|-----|--------|----------|
| ⊟ | 32/7 | V A1A2 | 04:20:14:06 | KJ058171-9975+05 | 04:21:19:14 | 73+03 | 1:05:08 |
| ⊟ | A51/3 | V | 04:04:51:01 | KJ058204-0756+09 | 04:05:03:26 | 775+13 | 12:25 |
| ⊟ | A51/5 | V A1A2 | 04:03:26:13 | KJ058204-0629+10 | 04:04:48:09 | 752+07 | 1:21:26 |
| ⊟ | 57/5 | V | 04:06:41:08 | KJ058171-0921+14 | 04:07:00:05 | 950+04 | 18:28 |
| ⊟ | 57/6 | V A1A2 | 04:08:05:14 | KJ058171-1048+03 | 04:09:27:10 | 171+00 | 1:21:26 |
| ⊟ | 57/8 | V A1A2 | 04:11:02:09 | KJ058171-9147+07 | 04:12:20:08 | 264+06 | 1:17:29 |
| ⊟ | 68/2 | V | 04:14:26:05 | KJ058171-9453+04 | 04:15:44:06 | 570+05 | 1:18:01 |
| ⊟ | 87/1 | V | 04:00:05:25 | KJ158165-0328+12 | 04:01:23:25 | 445+12 | 1:18:00 |
| ⊟ | 87A/1 | V | 04:01:24:00 | KJ158165-0446+00 | 04:03:05:05 | 597+12 | 1:41:05 |
| ⊟ | 87A/4 | V | 04:03:07:11 | KJ158165-0601+01 | 04:03:26:06 | 629+05 | 18:25 |
| ⊟ | 91/3 | V A1A2 | 04:16:41:13 | KJ058171-9656+02 | 04:18:03:14 | 779+03 | 1:22:01 |

FIG. 5

ELECTRONIC FILM EDITING SYSTEM USING BOTH FILM AND VIDEOTAPE FORMAT

This application is a division of application Ser. No. 07/908,192 filed Jul. 1, 1992 now abandoned and refiled as Ser. No. 08/393,886.

BACKGROUND OF THE INVENTION

This invention relates to techniques for electronically editing film.

Film video and audio source material is frequently edited digitally using a computer system, such as the Avid/1 Media Composer from Avid Technology, Inc., of Tewksbury, Mass., which generates a digital representation of a source film, allowing a film editor to edit the digital version, rather than the film source itself. This editing technique provides great precision and flexibility in the editing process, and is thus gaining popularity over the old style of film editing using a flatbed editor.

The Avid/1 Media Composer accepts a videotape version of a source film, created by transferring the film to videotape using the so-called telecine process, and digitizes the videotape version for editing via manipulation by computer. The operation of the Media Composer is described more fully in copending application U.S. Ser. No. 07/866,829, filed Apr. 10, 1992, and entitled Improved Media Composer. The teachings of that application are incorporated he rein by reference. Editing of the digitized film version is performed on the Media Composer computer using CRT monitors for displaying the digitized videotape, with the edit details being based on videotape timecode specifications. Once editing is complete, the Media Composer creates an edited videotape and a corresponding edit decision list (EDL) which documents the videotape timecode specification details of the edited videotape. The film editor uses this EDL to specify a cut and assemble list for editing the source film. While providing many advantages over the old style flatbed film editing technique, this electronic editing technique is found to be cumbersome for some film editors who are unaccustomed to videotape timecode specifications.

SUMMARY OF THE INVENTION

In general, in one aspect, the invention provides a system for generating a digital representation of a video signal comprised of a sequence of video frames which each include two video fields of a duration such that the video plays at a first prespecified rate of frames per second. The sequence of video frames includes a prespecified number of redundant video fields. In the invention, redundant video fields in the video frame sequence are identified by a video processor, and the video frame sequence is digitized by an analog to digital convertor, excluding the identified redundant video fields. The digitized video frames are then compressed by a video compressor to generate a digital representation of the video signal which plays at a second prespecified rate of frames per second.

In preferred embodiments, the invention further provides for storing the digitized representation of the video signal on a digital storage apparatus. The redundant video fields are identified by assigning a capture mask value to each video field in the video frame sequence, the capture mask value of a field being a "0" if the field is redundant, and the capture mask value of a field being a "1" for all other video fields. A video frame grabber processes the video frame sequence based on the capture mask values to exclude the identified redundant video frames from being digitized. The video compressor compresses the video frames based on JPEG video compression.

In other preferred embodiments, the first prespecified video play rate is 29.97 frames per second and the second prespecified digital video play rate is 24 frames per second. The rate of the analog video signal is increased from 29.97 frames per second to 30 frames per second before the step of digitizing the video frame sequence. In further preferred embodiments, the analog video signal is a video representation of film shot at 24 frames per second, and the digital video play rate of 24 frames per second corresponds to the 24 frames per second film shooting rate. The analog video signal is a representation of film that is transferred to the video representation using a telecine apparatus.

In general, in another aspect, the invention provides an electronic editing system for digitally editing film shot at a first prespecified rate and converted to an analog video representation at a second prespecified rate. The editing system includes analog to digital converting circuitry for accepting the analog video representation of the film, adjusting the rate of the analog video such that the rate corresponds to the first prespecified rate at which the film was shot, and digitizing the adjusted analog video to generate a corresponding digital representation of the film. Further included is a digital storage apparatus for storing the digital representation of the film, and computing apparatus for processing the stored digital representation of the film to electronically edit the film and correspondingly edit the stored digital representation of the film.

In preferred embodiments, the system further includes digital to analog converting circuitry for converting the edited digital representation of the film to an analog video representation of the film, adjusting the rate of the analog video from the first prespecified rate to the second prespecified video rate, and outputting the adjusted analog video. Preferably, the analog video representation of the film accepted by the analog to digital converting circuity is an NTSC videotape. The apparatus for storing the digital representation of the film also stores a digitized version of a film transfer log corresponding to the digital representation of the film. The system includes display apparatus for displaying the digitized version of the film as the film is electronically edited and displaying a metric for tracking the location of a segment of the film as the segment is displayed, the metric being based on either film footage code or video time code, as specified by the system user.

The electronic editing system of the invention allows users to provide the system with film formatted on standard videotapes, NTSC tapes, for example, and yet allows the video to be digitally edited as if it were film, i.e., running at film speed, as is preferred by most film editors. By reformatting the analog video as it is digitized, the system provides the ability to electronically edit film based on the same metric used in conventional film editing.

BRIEF DESCRIPTION OF THE DRAWINGS

FIG. 4 is an Evertz Film Transfer Log produced by the telecine transfer system and processed by the editing system of the invention.

FIG. 5 is an illustration of a video screen showing the electronic bin generated by the editing system of the invention.

DESCRIPTION OF THE PREFERRED EMBODIMENT

Figure 1:
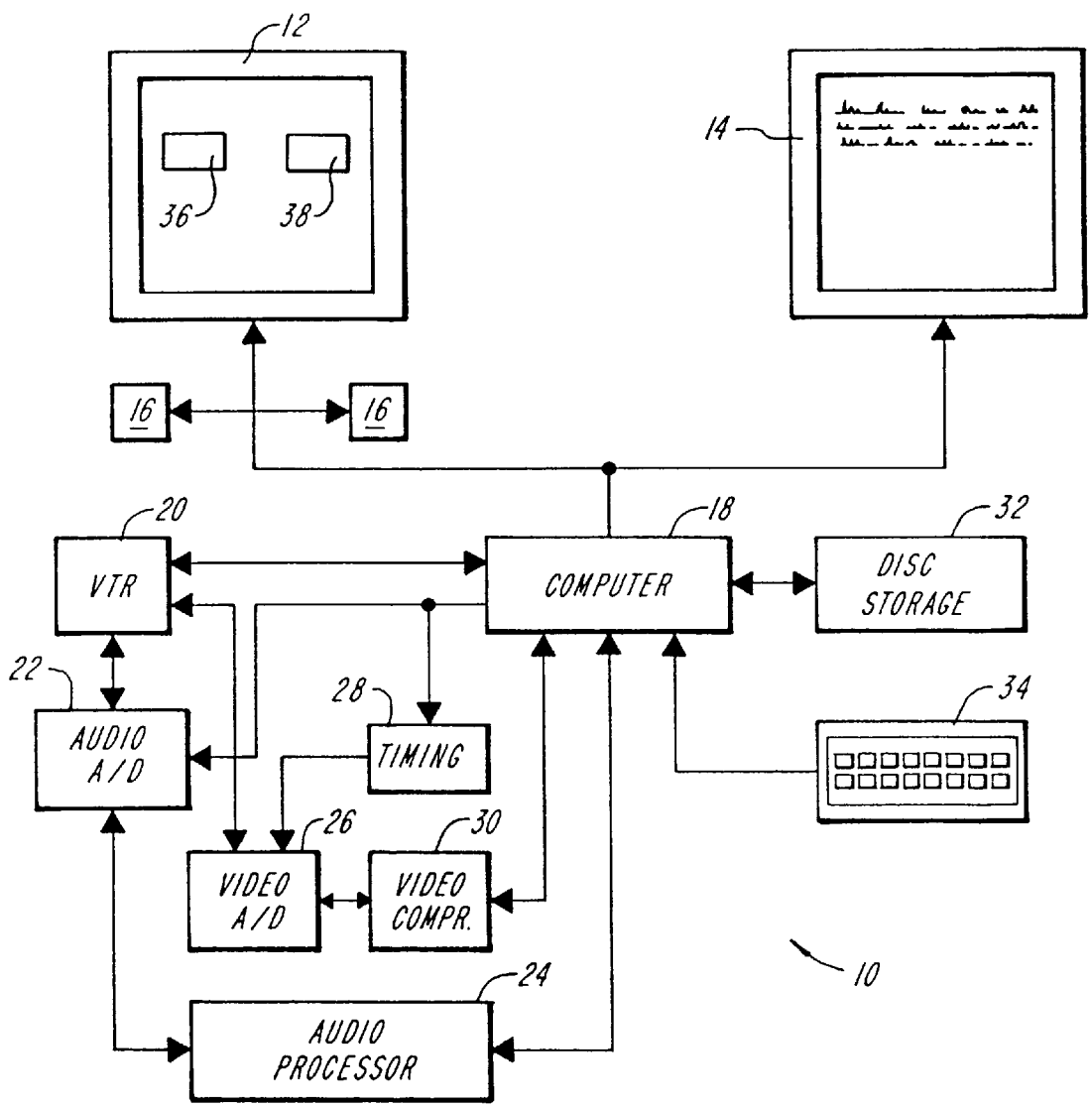
FIG. 1 is a schematic diagram of the electronic editing system of the invention.

Referring to FIG. 1, there is shown the electronic editing system of the invention 10, including two CRT displays 12, 14 for displaying digitized film during an editing session, and an audio output device 16, for example, a pair of speakers, for playing digitized audio during an editing session. The displays 12, 14 and audio output 16 are all controlled by a computer 18. Preferably, the computer is a Macintosh™ $II_{ci}$, $II_{fx}$, Quadra 900, or Quadra 950 all of which are available from Apple Computer, Inc., of Cupertino, Calif. The system includes a video tape recorder (VTR) 20 for accepting an electronic version of film footage, which is preprocessed and digitized by a video analog to digital converter (A/D) 26. A timing circuit 28 controls the speed of the video being digitized, as described below. A video compressor 30 is connected to the video A/D for compressing the electronic image data to be manipulated by the computer 18. An audio A/D 22 and audio processor 24 process audio information from the electronic version of film footage in parallel with the video processing. Disc storage 32 communicates with the computer to provide memory storage or digitized electronic image data. This disc storage may be optical, magnetic, or some other suitable media. The editing system is user-interfaced via a keyboard 34, or some other suitable user control interface.

In operation, video and audio source material from a film which has been transferred to a videotape is received by the system via the video tape recorder 20, and is preprocessed and digitized by the audio A/D 22, audio processor 24, video A/D 26, and video compressor 30, before being stored in the disc storage 32. The computer is programmed to display the digitized source video on a first of the CRTs 12 and play the accompanying digitized source audio on the audio output 16. Typically source material is displayed in one window 36 of the first CRT 12 and edited material is displayed in a second window 38 of that CRT. Control functions, edit update information, and commands input from the keyboard 32 are typically displayed on the second system CRT 14.

Once a film is input to the system, a film editor may electronically edit the film using the keyboard to make edit decision commands. As will be explained in detail below, the electronic editing system provides the film editor with great flexibility, in that the video displayed on the system CRT 12 may be measured and controlled in either the domain of film footage or the domain of videotape time code. This flexibility provides many advantages over prior electronic editing systems. At the end of an editing session, the electronic editing system provides the film editor with an edited videotape and both tape and film edit command lists for effecting the edits from the session on film or videotape.

As explained above, the electronic editing system 10 requires a videotape version of a film for electronic manipulation of that film. Such a tape is preferably generated by a standard film-tape transfer process, the telecine process, which preferably uses the Time Logic Controller™ telecine (TLC), a device that converts film into a video signal, then records the signal on videotape. A TLC controls the film-tape transfer more precisely than non-TLC system. In addition, it outputs a report, described below, that includes video format specifications, i.e., timecode, edge number, audio timecode, scene, and take for each reference frame in each tape, thereby eliminating the need to search through the video or film footage manually to find the data required for creating a log of video playing particulars. Other telecine systems may be used, however, depending on particular applications.

Transfer from film to tape is complicated by the fact that film and video play at different rates—film plays at 24 frames per second (fps), whereas PAL video plays at 25 fps and NTSC (National Television Standards Committee) video plays a 29.97 fps. If the film is shot at the standard rate of 24 fps and then transferred to 29.97 fps NTSC video, the difference between the film and video play rates is large (and typically unacceptable). As a result, they film speed must be adjusted to accommodate the fractional tape speed, and some film frames must be duplicated during the transfer so that both versions have the same duration. However, if the film is shot at 29.97 fps, then transferring the footage to NTSC video is simple. Each film frame is then transferred directly to a video frame, as there are the same number of film and video frames per second.

Considering the most common case, in which 24 fps film is to be transferred to 29.97 fps NTSC videotape, the telecine process must provide both a scheme for slowing the film and a frame duplication scheme. The film is slowed down by the telecine apparatus by 0.1% of the normal film speed, to 23.976 fps, so that when the transfer is made, the tape runs at 29.97 fps, rather than 30 fps. To illustrate the frame duplication scheme, in the simplest case, and disregarding the film slow-down requirement, one second of film would be transferred to one second of video. The one second of film would include 24 frames of film footage, but the corresponding one second of video would require 30 frames of footage. To accommodate this discrepancy, the telecine process duplicates one film frame out of every four as the film is transferred to tape, so that for each second of film footage, the corresponding second of tape includes six extra frames.

Each video frame generated by the telecine process is actually a composite of two video fields: an odd field, which is a scan of the odd lines on a video screen, and an even field, which is a scan of the even lines. A video field consists of 262½ scan lines, or passes of an electron beam across a video screen. To creat a full video frame comprised of 525 scan lines, an odd field, or scan of the odd lines, is followed by an even field, or scan of the even lines. Thus, when a duplicate video frame is generated and added in the telecin process, duplicate video fields are actually created. During play of the resulting tape, each two video fields are interlaced to make a single frame by scanning of the odd lines (field one) followed by scanning of the even lines (field two) to create a complete frame of NTSC video.

Figure 2:
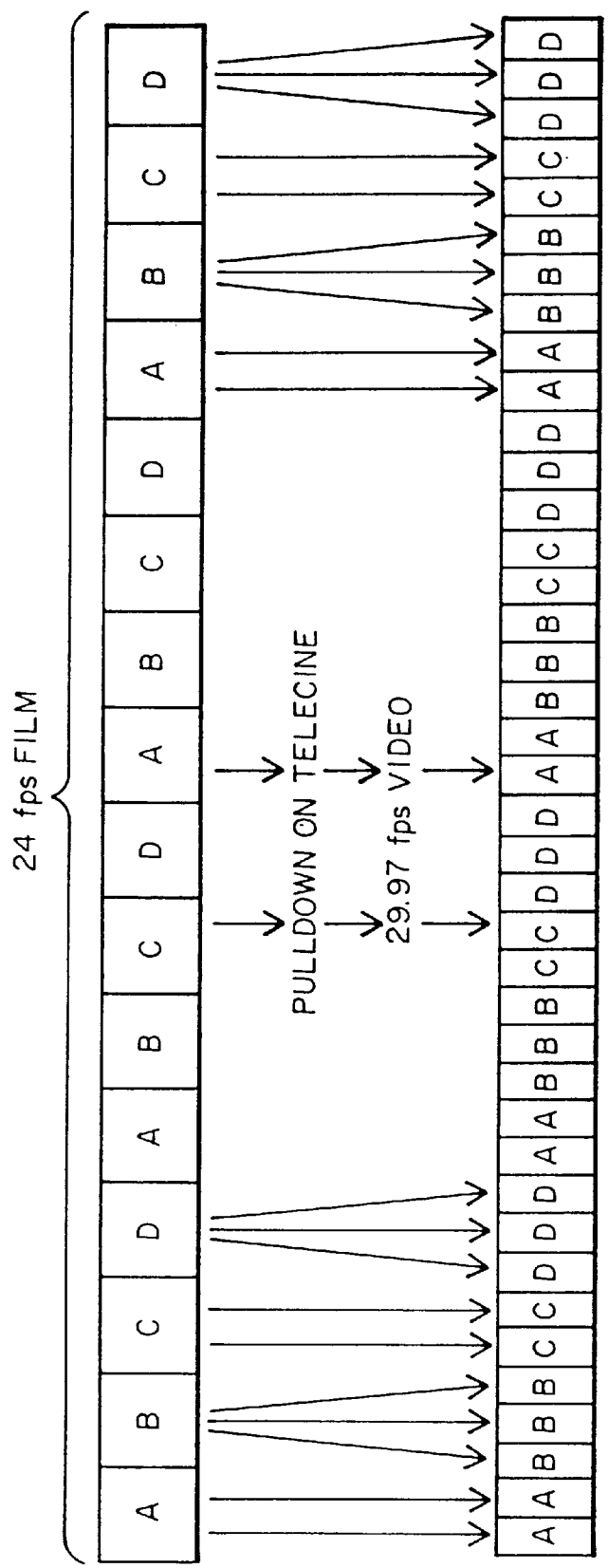
FIG. 2 is a diagram of the telecine film-tape transfer pulldown sceneme.

There are two possible systems for creating duplicate video fields in the telecine process, those systems being known as 2-3 pulldown and 3-2 pulldown. The result of the 2-3 pulldown process is schematically illustrated in FIG. 2. In a film-tape transfer using 2-3 pulldown, the first film frame (A in FIG. 2) is transferrer to 2 video fields AA of the first video frame; the next film frame B is transferred to 3 video fields BBB, or one and one half video frames, film frame C is transferred to two video fields CC, and so on. This 2-3 pulldown sequence is also referred to as a SMPTE-A transfer. In a 3-2 pulldown transfer process, this sequence of duplication is reversed; the first film frame A would be mapped to 3 video fields, the next film frame B would be mapped to 2 video fields, and so on. This 3-2 pull down sequence is also referred to as a SMPTE-B transfer. In either case, 4 frames of film are converted into 10 video fields, or 5 frames of video footage. When a 2-3 pulldown sequence is used, an A, B, C, D sequence in the original film footage creates an AA, BB, BC, CD, DD sequence of fields in the video footage, as shown in FIG. 2. The telecine process slows down the film before the frame transfer and duplication process, so that the generated video frames run at 29.97 fps.

Figure 3:
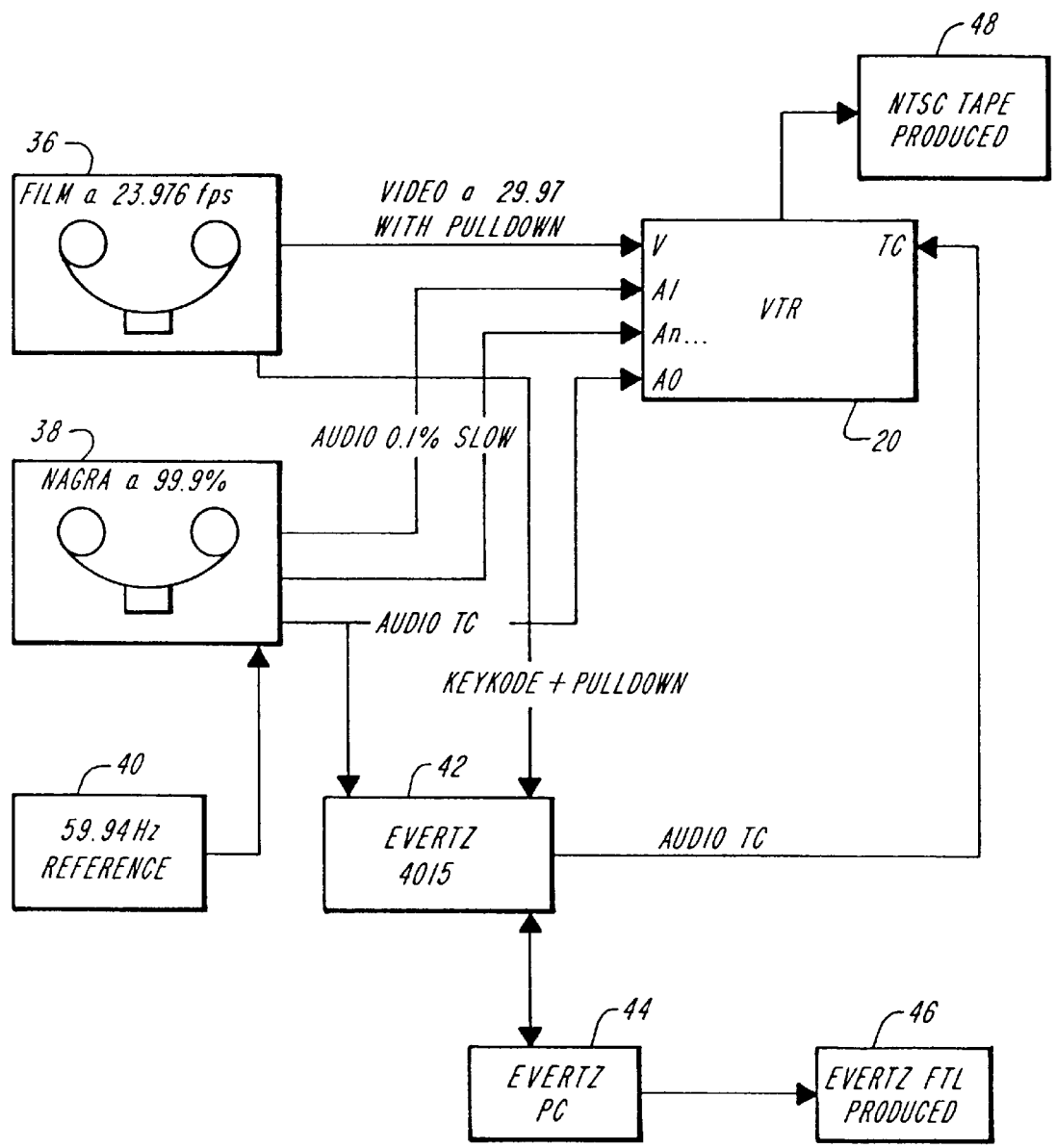
FIG. 3 is a schematic diagram of the telecine film-tape transfer system.

Referring to FIG. 3, as discussed above, the telecine 36 produces a video signal from the film; the video is generated to run at 29.97 fps and includes redundant film frames from the pulldown scheme. NAGRA™ audio timecode is the typical and preferable system used with films for tracking the film to its corresponding audiotape. During the telecine process, a corresponding audio track 38 is generated based on the NAGRA™ and is slowed down by 0.1% so that it is synchronized to the slowed film speed. The sound from the film audiotrack is provided at 60 Hz; a timing reference 40 at 59.94 Hz slows the audio down as required. Thus, the telecine process provides, for recordation on a videotape 48 via a videotape recorder 20, a video signal (V in the figure), corresponding audio tracks, $A_1-A_n$, and the audio timecode (audio TC).

A further film-tape correspondence is generated by the telecine process. This is required because, in addition to the difference between film and video play rates, the two media employ different systems for measuring and locating footage. Film is measured in feet and frames. Specific footage is located using edge numbers, also called edge code or latent edge numbers, which are burned into the film. For example, Kodak film provides Keykode™ on the film to track footage. The numbers appear once every 16 frames, or once every foot, on 35 mm film. The numbers appear once every 20 frames, or every half foot, on 16 mmn film. Note that 35 mm film has 16 frames per foot, while 16 mm film has 40 frames per foot. Each edge number includes a code for the film manufacturer and the film type, the reel, and a footage counter. Frames between marked edge numbers are identified using edge code numbers and frame offsets. The frame offset represents the frame's distance from the preceding edge number.

Videotape footage is tracked and measured using a time-base system. Time code is applied to the videotape and is read by a time code reader. The time code itself is represented using an 8-digit format: XX:XX:XX:XX— hours:minutes:seconds:frames. For example, a frame occurring at 11 minutes, 27 seconds, and 19 frames into the tape would be represented as 00:11:27:19.

It is preferable that during the telecine conversion, a log, called a Film Transfer Log (FTL), is created hat makes a correspondence between the film length-base and the video time-base. The FTL documents the relationship between one videotape and the raw film footage used to create that tape, using so-called sync points. A sync point is a distinctive frame located at the beginning of a section of film, say, a clip, or scene, which has been transferred to a tape. The following information documents a sync point: edge number of the sync point in the film footage, time code of the same frame in the video footage, the type of pulldown sequence used in the transfer, i.e., 2-3 pulldown or 3-2 pulldown, and the pulldown mode of the video frame, i.e., which of the A, B, C, and D frames in each film five-frame series corresponds to the sync point frame.

As shown in FIG. 3, an Evertz 4015 processor accepts the video signal from the telecine and the audio TC corresponding to the audiotrack and produces a timecode based on a synchronization of the audio and video. Then an Evertz PC 44 produces an Evertz FTL 46 which includes the sync point information defined above.

FIG. 4 illustrates a typical Evertz FTL 46. Each column of the log, specified with a unique Record #, corresponds to one clip, or scene on the video. Of particular importance in this log is the VideoTape Time Code In (VTTC IN) column 50 and VideoTape Time Code Out (VTTC OUT) column 52. For each scene, these columns note the video time code of the scene start and finish. In a corresponding manner, the Keyin column 54 and Keyout column 56 note the same points in film footage and frames. The Pullin column 58 and Pullout column 60 specify which of the A, B, C, or D frames in the pulldown sequence correspond to the frame at the start of the scene and the close of the scene. Thus, the FTL gives scene sync information that corresponds to both the video domain and the film domain.

The electronic editing system of the invention accepts a videotape produced by the telecine process and an Evertz FTL, stored on, for example, a floppy disk. When the FTL data on the disk is entered into the system, the system creates a corresponding bin in memory, stored on the system disc, in analogy to a film bin, in which film clips are stored for editing. The electronic bin contains all fields necessary for film editing, all comments, and all descriptions. The particulars of the bin are displayed for the user on one of the system's CRTs. FIG. 5 illustrates the display of the bin. It correspond directly to the Evertz FTL. The "Start" and "End" columns of the bin correspond to the VideoTape Time Code In and VideoTape Time Code Out columns of the FTL. The "KN Start" and "KN End" columns of the bin correspond to the Keyin and Keyout columns of the FTL. During an editing session, the bin keeps track of the editing changes in both the video time-base and the film footage-base, as described below. Thus, the bin provides the film editor with the flexibility of keeping track of edits in either of the metrics.

Referring again to FIG. 1. when the electronic editing system 10 is provided with a videotape at the start of a film editing session, the videotape recorder 20 provides to the computer 18 the video and audio signals corresponding to the bin. The video signal is first processed by a video A/D coprocessor 26, such as the NuVista board made by TrueVision of Indianapolis, Ind. A suitable video coprocessor includes a video frame grabber which converts analog video information into digital information. The video coprocessor has a memory which is configured using a coprocessor such as the TI34010 made by Texas Instruments, to provide an output data path to feed to the video compression circuitry, such as JPEG circuitry, available as chip CL550B from C-Cube of Milpitas, Calif. Such a configuration can be performed using techniques known in the art. A timing circuit 28 controls the speed of the video signal as it is processed.

In operation, the video A/D 26 processes the video signal to reformat the signal so that the video represented by the signal corresponds to film speed, rather than videotape speed. The reformatted signal is then digitized, compressed, and stored in the computer for electronic film editing. This reformatting process allows users to provide the editing system with standard videotapes, in NTSC format, yet allows the video to be edited as if it were film, i.e., running at film speed, as is preferred by most film editors.

Figure 6:
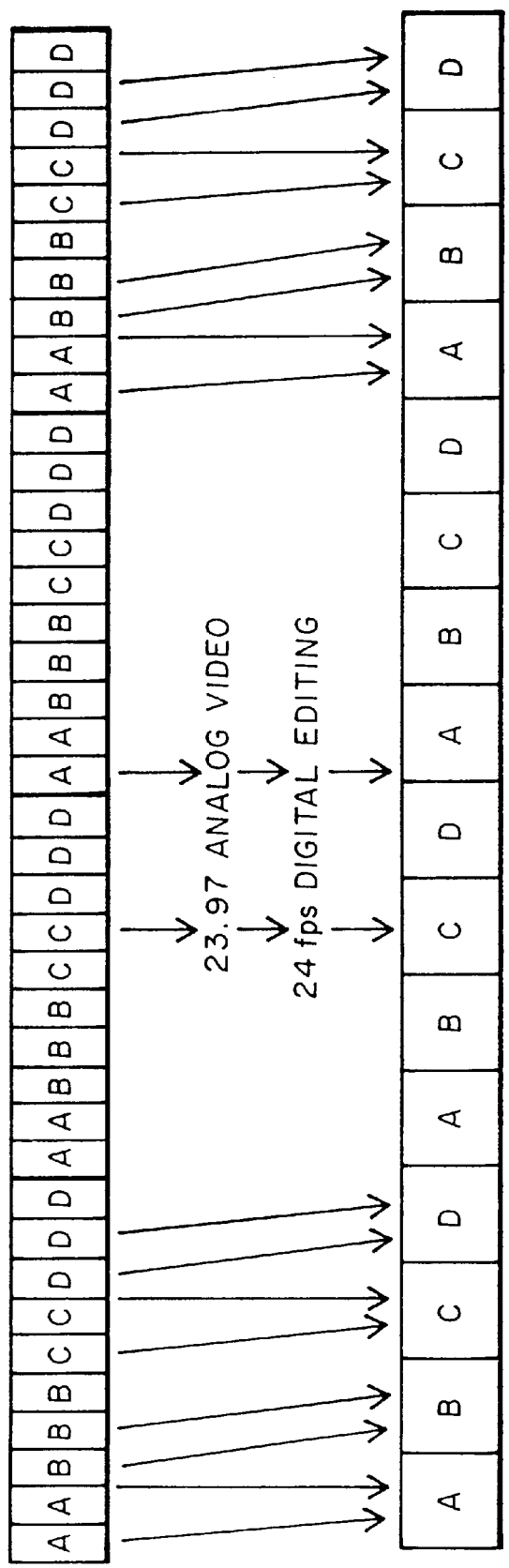
FIG. 6 is a diagram of the scheme employed by the editing system in digitizing a video input to the system.

Referring also to FIG. 6, in this reformatting process, the speed of the video from the videotape is increased from 29.97 fps to 30 fps, as commanded by the timing circuitry 28 (FIG. 1). Then the fields of the video are scanned by the system, and based on the pulldown sequence and pulldown mode specified for each scene by the bin, the redundant video fields added by the telecine process are noted, and then ignored, while the other, nonredundant, fields are digitized and compressed into digital frames. More specifically, a so-called "capture mask" is created for the sequence of video fields; those fields which are redundant are assigned a capture value of "0" while all other fields are assigned a capture value of "1". The system coprocessor reads the entire capture mask and only captures those analog video fields corresponding to a "1" capture value, ignoring all other fields. In this way, the original film frame sequence is reconstructed from the video frame sequence. Once all the nonredundant fields are captured, the fields are batch digitized and compressed to produce digitized frames.

Assuming the use of the 2-3 pulldown scheme, as discussed above, in the capture process, the first two analog video fields (AA in FIG. 6) would each be assigned a capture value of "1", and thus would be designated as the first digital frame; the next two analog video fields BB would also each be assigned a capture value of "1", and be designated as the second digital frame; but the fifth analog video field B, which is redundant, would be assigned a capture value of "0", and would be ignored, and so on. Thus, this process removes the redundant 6 frames added by the telecine process for each film second from the video, thereby producing a digitized representation which corresponds directly to the 24 fps film from which the video was made. This process is possible for either the 2-3 or 3-2 pulldown scheme because the bin specifies the information necessary to distinguish between the two schemes, and the starting frame (i.e., A, B, C, or D) of either sequence is given for each scene.

Appendix A of this application consists of an example of assembly language code for the MacIntosh™ computer and the TI 34010 coprocessor for performing the reformatting process. This code is copyrighted, and all copyrights are reserved.

Referring again to FIG. 1, an audio A/D 22 accepts audio from a videotape input to the editing system and like the video A/D 26, increases the audio speed back to 100%, based on the command of the timing circuitry 28. The audio is digitized and then processed by the audio processor 24, to provide digitized audio corresponding to the reformatted and digitized video. At the completion of this digitization process, the editing system has a complete digital representation of the source film in film format, i.e., 24 fps, and has created a bin with both film footage and video timecode information corresponding to the digital representation, so that electronic editing in either time-base or footage-base may begin.

There are traditionally three different types of film productions that shoot on film, each type having different requirements of the electronic editing system. The first film production type, commercials, typically involves shooting on 35 mm film, transferring the film to a videotape version using the telecine process, editing the video based on the NTSC standard, and never editing the actual film footage, which is not again needed after the film is transferred to video. Thus, the electronic editing is here preferably based on video timecode specifications, not film footage specifications, and an NTSC video is preferably produced at the end of the edit process. The electronic commercial edit should also preferably provide an edit decision list (EDL) that refers back to the video; the edited version of this video is typically what is actually played as the final commercial.

The second production type, episodic film, involves shooting on either 35 or 16 mm film, and producing an NTSC videotape version and additionally, an (optional) edited film version for distribution in markets such as HDTV (High Definition Television) or foreign countries. To produce the edited film footage for the film version, the film is transferred to videotape using the telecine process, and electronic editing of the film is here preferably accomplished based on film footage, and should produce a cutlist, based on film footage specifications, from which the original film is cut and transferred to the NTSC format. To produce a video version, the videotape is then preferably edited based on video timecode specifications to produce an EDL for creating an edited video version.

The third film production type, feature film, typically involves shooting on 35 mm film, and produces a final film product; thus electronic editing is here preferably based on film footage specifications to produce a cutlist for creating a final film version.

Figure 7:
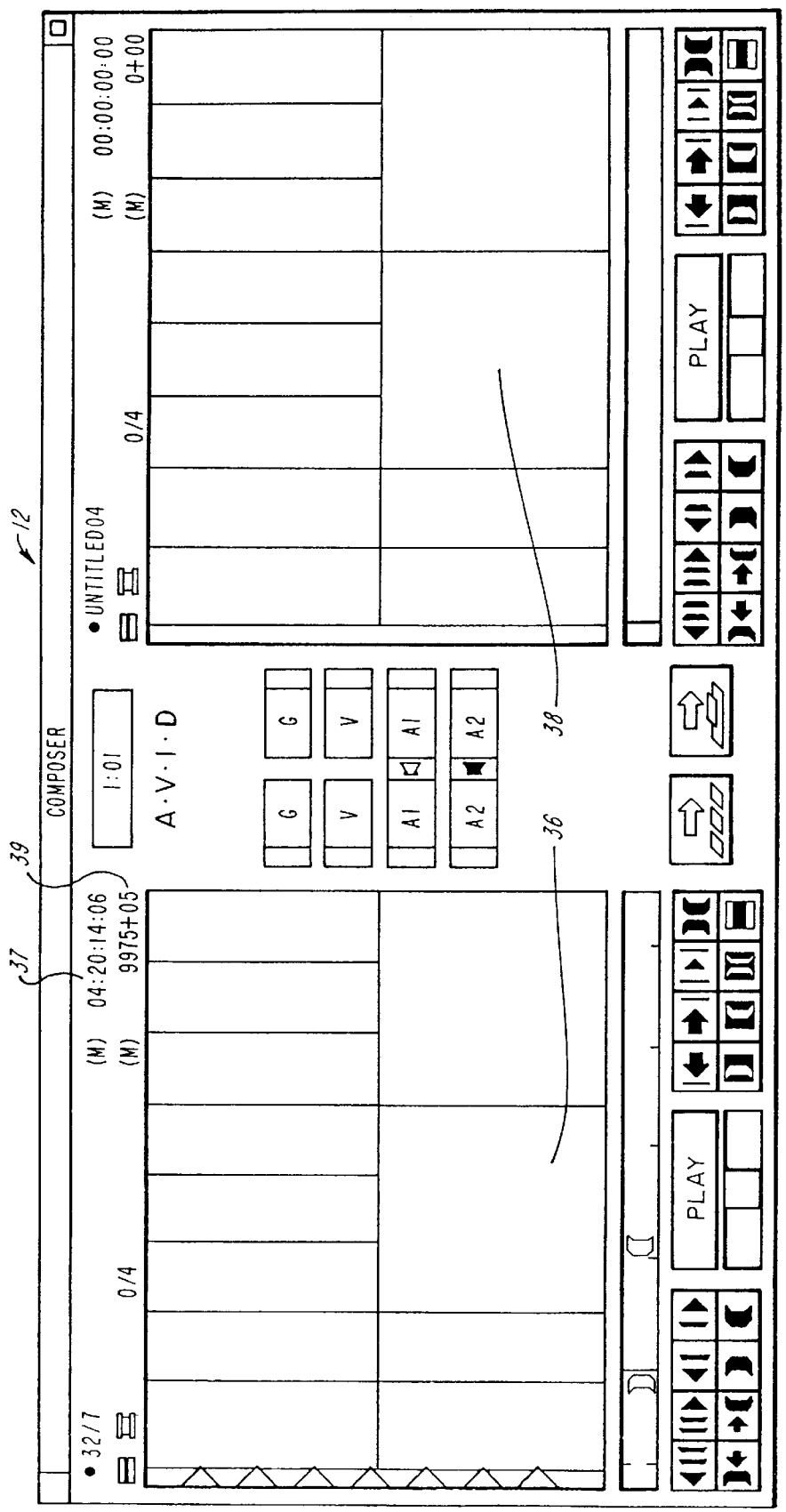
FIG. 7 is an illustration of a video screen showing the digitized video to be edited on the electronic editing system of the invention.

The user interface of the electronic editing system is designed to accommodate film editors concerned with any of the three film production types given above. As shown in FIG. 7, the video display CRT 12 of the system, which includes the source video window 36 and edited video window 38, displays metrics 37, 39 for tracking the position of digital frames in a scene sequence currently being played in the source window or the edit window. These metrics may be in either film footage format or video time code format, whichever is preferred by the user. Thus, those film editors who prefer film footage notation may edit in that domain, while those film editors who prefer video timecode notation may edit in that domain. In either case, the digitized frames correspond exactly with the 24 fps speed of the original source film, rather than the 29.97 fps speed of videotape, so that the electronic edits produced by the electronic editing correspond exactly with the film edits, as if the film were being edited on an old-style flat bed editor.

As an example of an editing session, one scene could be selected from the bin and played on the source window 36 of the system CRT display 12. A film editor could designate frame points to be moved or cut in either timecode or film footage format. Correspondingly, audio points could be designated to be moved or the audio level increased (or decreased). When it is desired to preview a video version of such edits, an NTSC video is created by the system based on the sync information in the electronic bin, from the system disc storage, to produce either a so-called rough cut video, or a final video version. In this process, the system generates an analog version of the digital video signal and restores the redundant video frames necessary for producing the NTSC video rate. The system also produces a corresponding analog audio track and decreases the audio speed so that the audio is synchronized with the video. In this way, the system essentially mimics the telecine process by slowing down the video and audio and producing a 29.97 fps videotape based on a 24 fps source.

Referring again to FIG. 1, in creating an NTSC video from a digitized film version, the video compressor 30 retrieves the digitized video frames from the computer 18 and based on the electronic bin information, designates video fields. The video A/D 26 then creates an analog version of the video frames and processes the frames using a pulldown scheme like that illustrated in FIG. 2 to introduce redundant video frames. The video speed is then controlled by the timing circuit 28 to produce 29.97 fps video as required for an NTSC videotape. Correspondingly, the system audio process 24 and audio A/D 22 processes the digital audio signal based on the electronic bin to generate an analog version of the signal, and then slows the signal by 0.1% to synchronize the audio with the NTSC video. The final video and audio signals are sent to the videotape recorder 20, which records the signals on a videotape.

The electronic editing system may be programmed to produce an edit listing appropriate to the particular media on which the finalized version of the film source material is to appear. If the source film material is to be finalized as film, the system may be specified to produce a cut list. The cut list is a guide for conforming the film negative to the edited video copy of the film footage. It includes a pull list and an assemble list. The assemble list provides a list of cuts in the order in which they must be spliced to together on the film. The pull list provides a reel-by-reel listing of each film cut. Each of these lists specifies the sync points for the cuts based on film footage and frame keycode, as if the film had been edited on a flatbed editor. If the source film material is to be finalized as video, the system may be specified to produce an edit decision list (EDL). The EDL specifies sync points in video time code, as opposed to film footage. The editing system generates the requested edit lists based on the electronic bin; as the film is electronically edited, the bin reflects those edits and thus is a revised listing of sync points corresponding to the edited film version. Because the bin is programmed to specify sync points in both film footage and video timecode, the editing system has direct access to either format, and can thereby generate the requested EDL or assemble and pull lists. Appendix B consists of examples of an EDL, assemble lists, and pull lists, all produced by the electronic editing system. Thus, at the end of an electronic film edit, the editing system provides a film editor with an NTSC videotape of the film edits and edit list for either film or videotape.

Other embodiments of the invention are within the scope of the claims.

APPENDEX A

```
/*
 * /---------------------------------------------------------------------------------------\
 * |  The following programs are the sole property of Avid Technology, Inc.,                |
 * |  and contain its proprietary and confidential information.                             |
 * |  Copyright © 1989-1992 Avid Technology, Inc.                                           |
 * \---------------------------------------------------------------------------------------/
 *
 * Module Name: mfm_allocate.c
 *
 * Module Description:
 */
#include    "mfm_allocate.h"
#include    "AvidGlobals.h"
#include    "expansionDefs.h"
#include    "LinkList.h"
#include    "mfm.h"
#include    "disk_mac.h"
#include    "memrtns.h"
#include    "Digitize.h"
#include    "LogicalToPhysical.h"
#include    "channel.h"
#include    "ResourceBible.h"
#include    "env.h"
#include    "uid.h"
#include    "MacUtils.h"
#include    "DebugUtils.h"
#include    "VolumeMenu.h"
#include    "JPEGUtils.h"
#include    "Exception.h"
#include    "dialogUtils.h"
#include    "FSutils.h"
#include    "BaseErrorDefs.h"
#include    "autorequest.h"
#include    "ResourceDefs.h"
#include    "videoDefs.h"
#define BREATHING_ROOM 200    /* KB to leave for directory expansion */
#define DIG_MODE    1
#define LOG_MODE    2
typedef struct
    {
    MFM_CRUX    crux;
    short       vRef;
    channel_t   channel;
    long        bytesPerSec;
    long        blocksToAlloc;
    long        blockSize;
    } mfm_alloc_t,
    * mfm_alloc_ptr,
    **mfm_alloc_hdl;
/***** Static Variables *****/
static  listID      alloc           = NIL;
static  u_long      ApproxFrameSize = 1L;
static  char        theCapMode      = DIG_MODE;      // DIG_MODE, LOG_MODE
static  Ftype_t     theFtype        = 0;
static  float       theCapRate      = 0;
```

APPENDEX A-continued

```
static   MFM_CRUX       theVcrux         = 0;                      // When these are zero the cruxes are clo.
static   MFM_CRUX       theA1crux        = 0;
static   MFM_CRUX       theA2crux        = 0;
static   short          theVvref         = BAD_VREFNUM,
                        theAvref         = BAD_VREFNUM;
static   long           theSampsPerSec   = 0;
                        theBytesPerSamp  = 0;
static   long           theTimeAvail     = 0;                      // the minimum of the times available in
static   videoFormat_t  theVideoFormat   = PAL_f;                  // more likely to catch bugs by initing t.
static   sourceFormat_t theSourceFormat  = VIDEO_f;
static   videoType_t    theVideoType     = {8, vMHiResHiColor};    // HACK for now
static   capture_mask_t theCaptureMask   = 0L;
static   capture_mask_t theResultMask    = 0L;
static   u_char         theCapShift      = 0;
static   u_char         theResultShift   = 0;
static   channel_t      theChannels      = 0;
static   audioClock_t   theAudioClock    = Clock44100;
static   audioRate_t    theAudioRate     = halfRate;
static   Boolean        theAudioMixed    = FALSE;
static   Boolean        useEmptiestVideo = TRUE;
                        useEmptiestAudio = TRUE;
/***** Defined Below *****/
static   void           setVinfo( Ftype_t Ftype, capture_mask_t captureMask, u_char captureShift, float captu
static   void           amMItem2Val( short mitem, audioClock_t *audioClock, audioRate_t *audioRate, long *aud
static   MFM_CRUX       mfaAllocCreate(long bytesPerSec, short vref, channel_t channel, Boolean preflight);
static   void           mfaAllocCalc(Boolean preflight);
static   void           mfaAllocEnd(void);
static   void           mfaAllocPunt(void);
static   long           TotalBytes(short theVref);
static   void           checkVolumeSettings(void);
static   videoModifier_t getVideoModifier(short iQuality, short cQuality);
/***********************************/
/****     Public Code           ****/
/***********************************/
/**********************************************************************************
 *
 * mfaSetSettinqs
 */
Boolean mfaSetSettings(  channel_t chans, float capRate, u_char phase,
                         audioClock_t audioClock, audioRate_t audioRate, Boolean audioMixed,
                         short Vvref, short Avref, videoType_t video_type)
{
Boolean  needsReinit;
mfaForgetFiles (OUT_ALL);
needsReinit = FALSE;
if(:CksumValid[ck_44khz]&& audioRate = fullRate)
    audioRate = halfRate;
if(:CksumValid[ck_48khz])
    audioClock = Clock44100;
if (theCapMode = DIG_MODE &&  (theChannels != chans ||
                               theCapRate != capRate ||
                               theAudioClock != audioClock ||
                               theAudioRate != audioRate ||
                               theAudioMixed != audioMixed))
      needsReinit = TRUE;
/*
 *    Set the mfm_allocate statics
/*
theChannels      = chans;
theCapRate       = capRate;
theAudioClock    = audioClock;
theAudioRate     = audioRate;
theAudioMixed    = audioMixed;
theVvref         = Vvref;
theAvref         = Avref;
useEmptiestVideo = (theVvref == BAD_VREFNUM);
useEmptiestAudio = (theAvref == BAD_VREFNUM);
xprotect
   {
   checkVolumeSettings ();
   }
xexception
   {
   if (!xcodeEquals (MFA_NO_MEDIA_DRIVES))
      xpropagate();
   auto_request("You will not be able digitize until a valid\nmedia volume is placed online.", "OK", 1);
   }
xend;
/*
```

APPENDEX A-continued

```
*       Setup video capture node info
/*
switch( (int) (theCapRate*10))
    {
    case 240:
        if( phase = 0)
            setVinfo (FULL, 0xD8000000L, 0, 24.0, 0x80000000L, 0);          // 1101 1xxx  ,4 ou
        else if( phase == 1)
            setvinfo (FULL, 0xB8000000L, 0, 24.0, 0x80000000L, 0);          // 1011 1xxx  ,4 ou
        else if( phase == 3)
            setVinfo (FULL, 0x78000000L, 1, 24.0, 0x80000000L, 0);          // 0111 1xxx  ,4 ou
        else
            setVinfo (FULL, 0xE8000000L, 0, 24.0, 0x80000000L, 0);          // 1110 1xxx  ,4 ou
        break;
    case 120:
        if( phase == 0 || phase == 1)
            setVinfo (FULL, 0x48000000L, 2, 12.0, 0x40000000L, 1);          // 0100 1xxx  ,2 ou
        else
            setVinfo (FULL, 0x28000000L, 2, 12.0, 0x40000000L, 1);          // 0010 1xxx  ,2 ou
        break;
    case  60:   setVinfo (FULL, 0x08000000L, 4,  6.0, 0x10000000L, 3); break;   // 0000 1xxx  ,1 ou
    case 300:   setVinfo (FULL, 0x80000000L, 0, 30.0, 0x80000000L, 0); break;   // 1xxx xxxx  ,1 ou
    case 153:   setVinfo (FULL, 0x40000000L, 1, 15.0, 0x40000000L, 1); break;   // 01xx xxxx  ,1 ou
    case 100:   setVinfo (FULL, 0x20000000L, 2, 10.0, 0x20000000L, 2); break;   // 001x xxxx  ,1 ou
    case 250:   setVinfo (FULL, 0x80000000L, 0, 25.0, 0x80000000L, 0); break;   // 1xxx xxxx  ,1 ou
    case 125:   setVinfo (FULL, 0x40000000L, 1, 12.5, 0x40000000L, 1); break;   // 01xx xxxx  ,1 ou
    case  50:   setVinfo (FULL, 0x08000000L, 4,  5.0, 0x08000000L, 4); break;   // 0000 1xxx  ,1 ou
    }
theSourceFormat = sourceFormat;                                             // Get it from global no
theVideoFormat = videoFormat;                                               // Get it from global no
theVideoType.vcID = gVideoType.vcID;                                        // Get it from global no
theVideoType.videoModifier = video_type.videoModifier;
SetDigitizeCaptureMask (theCaptureMask, theCapShift);
/*
*       Setup audio capture mode info
*/
theSampsPerSec  = ((audioRate = fullRate) ? (audioClockToClockRate(audioClock)) : (audioClockToClock)
theBytesPerSamp = (audioRate = fullRate ? 2 : 1 );
return needsReinit;
}
* Addresses of hardware registers:
divect          .set    0fffffea0h          ;the Display-Interrupt vector location
dpytrap         .set    0fffffea0h          ;address of DPYINT trap vector
mode            .set    0f8600000h          ;video mode register
status          .set    0f8290000h          ;video status register
vsblnk          .set    0c0000060h          ;gsp control registers:
vtotal          .set    0c0000070h          ;total vertical lines
dpyctl          .set    0c00000B0h          ;
dpystrt         .set    0c0000090h          ;
dpyint          .set    0c00000a0h          ;
control         .set    0c00000b0h          ;
hstctll         .set    0c00000f0h          ;
intanb          .set    0c0000110h          ;
intpend         .set    0c0000120h          ;
convsp          .set    0c0000130h          ;
convdp          .set    0c0000140h          ;
psize           .set    0c0000150h          ;
pmask           .set    0c0000160h          ;
pmaskext        .set    0c0000170h          ;
* Constants and masks:
msginmsk        .set    0007h               ;Fields in hstctll register
msgoutmsk       .set    0070h
msginisave      .set    0002h
msgindbg        .set    0007h
msgintmsk       .set    0008h               ;intin field in hstctll
msginf2         .set    0003h
msgoutisave     .set    0020h
msgoutdbg       .set    0070h
msgoutf2        .set    0030h
msgoutinc       .set    0010h
intin           .set    0008h
intout          .set    0080h
ctimsk          .set    801fh               ;Mask for the CONTROL register.
di              .set    10                  ;Bit number of Display Interrupt bit
dispint         .set    1<<di               ;"Display Interrupt" bit of intenb and intpend
ni              .set    14                  ;Bit number of Non Interlaced bit
notinteri       .set    1<<ni               ;The non-interlaced bit
ce_bit          .set    8000h               ;"Capture Enable" bit of video mode register
di              .set    10                  ;Bit number of Display Interrupt bit
```

APPENDEX A-continued

```
special         .set    2000000h        ;Offset for special JPEG hardware fifo "memory space"
palLines        .set    576             ;Number of lines in a frame
ntscLines       .set    480             ;Number of lines in a frame
rowbase         .set    0f8000000h      ;row table main picture starting address
traps           .set    0fffffc00h      ;address of trap page
macrows         .set    480             ;mac row table entries
vrows           .set    palLines+8      ;video rows in row table (incl color table & PAL)
crows           .set    palLines/2      ; Maximum # lines in a field (pal is larger)
maxField        .set    palLines/2      ; maximun #of lines in a field
pmemrow         .set    8000h           ;length in bits of physical memory rows
NVBLBIT         .set    4               ;Not Vertical Blanked -- bit position in video status reg
cpitch          .set    4000h           ;pitch of MAC (16-bit pixel) lines (2 kB)
dpShift         .set    14              ;Shifting a number by this muitiplies by dpitch
pixsize         .set    16              ;Pixel size constant for "psize" register
pstride         .set    64              ;Number of bits between pixel "hits" in output image
cmdNone         .set    0               ;undefined command code
cmdPlay         .set    1               ;normal multi-frame playback to alternate screen buffer
cmdPack         .set    2               ;(UNSED in FullRes)Pack 256*192 image
cmdUnpack       .set    3               ;unpack still frame to vcopy double buffer area (decompress)
cmdShow         .set    4               ;unpack and show a still frame in main screen buffer
cmdFull         .set    5               ;full-screen playback on an NTSC monitor
cmdBigPack      .set    6               ; pack a 640x480 image
cmdBigUnpack    .set    7               ; unpack an image to 640*480
cmdUnpackAdd    .set    8               ; unpack and combine an image
cmdUnpack16     .set    9               ; unpack a 16 bit frame in 32 bit mode
cmdPack16       .set    10              ; pack a 16 bit frame in 32 bit mode
vramBase        .usect  "vectors",32
frameBuf        .usect  "vectors",32
bigBuf          .usect  "vectors",32
* Routine to sync to an odd field:
syncodd:
s1    move    *Rstatp,Rtemp
      btst    0,Rtemp
      jrnz    s1
      move    *Rstatp,Rtemp
      jrnz    s1
s2    move    *Rstatp,Rtemp
      btst    0,Rtemp
      jrz     s2
      move    *Rstatp,Rtemp
      btst    0,Rtemp
      jrz     s2
      rets
* Routine to sync to an even field:
synceven:
s3    move    *Rstatp,Rtemp
      btst    0,Rtemp
      jrz     s3
      move    *Rstatp,Rtemp
      btst    0,Rtemp
      jrz     s3
s4    move    *Rstatp,Rtemp
      btst    0,Rtemp
      jmz     s4
      move    *Rstatp,Rtemp
      btst    0,Rtemp
      rets
MEMORY
{
  MAPPE2:  origin = 0ffd00000h,   length = 200000h
  NOMAP:   origin = 0fff00000h,   length = 0c8000h
  JSTAT:   origin = 0fb800000h,   length = 16
  VEC:     origin = 0fffd000h,    length = 000100h
}
SECTIONS
{
  vectors:   {} > VEC
  args:      {} > NOMAP
  .data:     {} > NOMAP
  .text:     {} > MAPPE2
  jstatus:   {} > JSTAT
}
.title "VISTA image capture and compress"
* /------------------------------------------------------------------------------\
* | The following programs are the sole property of Avid Technology, Inc.,       |
* | and contain its proprietary and confidential information.                    |
* | Copyright © 1989-1992 Avid Technology, Inc.                                  |
* \------------------------------------------------------------------------------/
* General register names:
```

APPENDIX A-continued

```
Rtemp      .set   A0          ;Temp register
Rpixcnt    .set   A1          ;Constant Pixels per line
Rpixel     .set   A2          ;Pointer to current input pixel
Rpxinc1    .set   A3          ;Constant # of bits to increment Rpixel to next input pixel
Rpxinc2    .set   A4          ;Alternate Constant to increment Rpixel to next input pixel
Rline      .set   A5          :Constant Pitch of an input line in bits (same value as Sptch)
Rpixtmp    .set   A6          ;Temp register for writing to pixel locations
Rjstatp    .set   A7          ;Constant pointer to JPEG fifo status
Rx         .set   A8          ;Counter of pixels in a line
Rnext      .set   A9          ;Pointer to next input line
Rstatp     .set   A10         ;Constant pointer to video status
Rblack     .set   A11         ;Pointer to a black pixel
Rtemp2     .set   A12
R13        .set   A13
R14        .set   A14
Saddr      .set   B0          ;Source pixel array starting address
Sptch      .set   B1          ;Source pitch (# of bits from one line to next)
Offset     .set   B4          ;Base address of source pixel array
Bxy        .set   B7          ;Pixel array dimensions(rows:columns)
Rlincnt    .set   B9          ;Constant: lines per frame
Ry         .set   B10         ;Counter: lines per frame
Rcapture   .set   B11         ;Bit mask: frame skipper
Rloadcap   .set   B12         ;Bit mask: used to reinit Rcapture
RB13       .set   B13
RB14       .set   B14
pixmsk     .set   8000h       ;Constant for "pmask" register (kill alpha chan)
spitch     .set   8000h       ;Constant for "Sptch" register (4 kBytes in bits)
           .copy  "equates.i"
jstatus    .usect "jstatus",16   ;JPEG fifo status
* Args TO <- and FROM -> the NuVista processor:
initcm     .usect "args",32   ;<-initial capture mask
capmsk     .usect "args",32   ;<-reload capture mask
overrun    .usect "args",32   ;->number of overruns detected (inited by Mac)
frames     .usect "args",32   ;->number of frames seen (inited by Mac)
tdummy1    .usect "args",32   ;"fence" arg in other µcode <-
tdummy2    .usect "args",32   ;"fencerr" arg in other µcode ->
tx         .usect "args",32   ;<-number of x locs to hit
ty         .usect "args",32   ;<-number of y locs (lines) to hit
tstride1   .usect "args",32   ;<-stride in bits between input pixel locs
tstride2   .usect "args",32   ;<-alt stride in bits between input pixel locs
tdelay     .usect "args",32   ;<-amount of delay before capturing each line (default = 1)
           .copy  "captureMacros.i"
    .data
stack:     .bes   4000h       ;Stack space (2kB) for calls and interrupts
    .page
    .text
    .align
Flag:
    .long  0                  ; Debug: Current vaiue of pixel fifo status
Dat:
    .long  0,0,0,0,0,0,0,0    ; Reserved for debug info
* Start of main program
    .def   _main
_main
    setf   16,0,0              ; Field zero is 16-bit unsigned
    setf   32,0,1              ; Field one is 32-bit unsigned
    movi   stack,sp            ; Load stack pointer
    movi   spitch,Sptch        ; Load contstant number of bits per line
    move   Sptch,Rline
    movi   pixmsk,Rtemp        ; Init pixel mask
    move   Rtemp,@pmask
    move   Rtemp,@pmaskext
    movi   jstatus+8,Rjstatp   ; Load pointer to JPEG status register
    clr    Rpixtmp             ; Clear pixel temp
    movi   status,Rstatp       ; Load pointer to video status register
* Clear DONE and wait for GO:
    clr    Rtemp
    movb   Rtemp,@hstctll      ;clear msgout (the DONE bit and interrupt bits) to host
hosths:
    movb   @hstctll,Rtemp      ;read host control register
    andi   msginmsk,Rtemp      ;mask message
    jrz    hosths              ;wait for GO signal (any non-zero value)
    movi   msgoutimc,Rtemp
    move   Rtemp,@hstctll      ;set indicator to let host know we have started
* Get some host args into registers:
    move   @tx,Rpixcnt,1       ;number of stores in x
    move   @ty,Rlincnt,1       ;number of lines in frame
    move   @tstride1,Rpxinc1,1 ;number of bits between pixels
    move   @tstride2,Rpxinc2,1 ;alt number of bits between pixels
```

APPENDEX A-continued

```
* For debug, write parameters back to memory:
    movi    Dat,Rtemp               ;get addr of debug dump area
    move    Rpxcnt,*Rtemp+,1        ;x
    move    @ty,*Rtemp+,1           ;y
    move    Rpxinc1,*Rtemp+,1       ;stride 1
    move    Rpxinc2,*Rtemp+,1       ;stride 2
    move    Rline,*Rtemp+,1         ;source pitch in bits (number of bits from one line to the next)
* N.B. The x argument (Rpixcnt) MUST be a muitiple of 32!
    srl     5,Rpixcnt               ;divide line length (x) by 32 for unrolled loop
    callr   syncodd                 ;FIRST TIME: Wait for start of odd field
    move    @mode,Rtemp
    ori     ce_bit,Rtemp            ;set the global capture enable bit (begins digitizing)
    move    Rtemp,@mode
    move    @initcm,Rcapture,1      ;load initial capture mask
    move    @captmsk,Rloadcap,1     ;load value to reinitialize capture mask
    movi    black-special,Rblack    ;address of black ("0")
    jruc    frame
black:
    .long   0,0
    .align                          ;align the following code with the I-cache
skpfram:                            ;come here to skip capturing a frame
    callr   synceven
    callr   syncodd
* Attempt capturing a frame:
frame:
* Count the frame (N.B. We must count every frame seen, whether captured or skipped):
    move    @frames,Rtemp,1
    addk    1,Rtemp                 ;count
    move    Rtemp,@frames,1
* Decide whether this is a frame we want, based on capture mask:
    sll     1,Rcapture              ;check next mask bit (it goes to C-bit)
    jrnc    skpfram                 ;skip this frame if C-bit is zero (last active bit guaranteed to be 1)
    jrnz    mskok                   ;check if need to reload mask bits: yes->fall thru
    move    Rloadcap,Rcapture       ;reload the capture mask (32 bits) for next time
mskok:
* Prepare for "lines" loop:
    move    @vramBase,Rpixel,1
    subi    special,Rpixel,1
*   movi    capture-special,Rpixel  ;starting address of video frame bufr (Special space)
    move    Rpixel,Rnext            ;remember address of first line
    move    Rlincnt,Ry              ;get number of lines in frame
* Check video field (s/b ODD from compressing prev frame or from syncodd after hosths or skpfram).
* (N.B. Assumes compression takes more than one field time (~1/60th second), but less than a frame time.)
    callr   syncevck                ;wait for start of even field (i.e. digitizing complete)
* Add 8 lines of black to the top of the picture:
    movk    8,Rtemp2                ;eight groups of one line
blk
    move    Rpixcnt,Rx              ;pixels-per-line / 32
    sll     5-2,Rx                  ;calc the loop count ( *32^ /4hits-per-loop)
loop2b:
    movb    *Rjstatp,Rtemp          ;read JPEG pixel fifo status
*   move    Rtemp,@Flag,0           ;*debug*
    jrnn    loop2b                  ;wait until fifo ready (bit7 == 1)
blkloop
    move    Rpixtmp,*Rblack,0       ;each write causes auto xfer(s) to JPEG pixel fifo.
    move    Rpixtmp,*Rblack,0
    move    Rpixtmp,*Rblack,0
    move    Rpixtmp,*Rblack,0
    dsjs    Rx,blkloop              ;1 line of pixels
    dsjs    Rtemp2,blk
* Send frame interrrupt to the Mac:
    move    @hstctll,Rtemp          ;get hstctll value
    ori     intout,Rtemp            ;set interrupt bit
    move    Rtemp,@hstctll          ;send to host to indicate frame start
* Start of loop to process all lines of a frame:
lines:
    add     Rline,Rnext             ;calc addr of next line
    move    Rpixcnt,Rx              ;(re)load x count (pixels-per-line / 32)
*   move    @tdelay,Rtemp2,1        ;DEBUG
*loop2d:
*   dsjs    Rtemp2,loop2d           ;DEBUG
loop2j:
    movb    *Rjstatp,Rtemp          ;read JPEG pixel fifo status
*   move    Rtemp,@Flag,0           ;*debug*
    jrnn    loop2j                  ;wait until fifo ready (bit7 == 1)
loop2:
    move    Rpixtmp,*Rpixel,0       ;this write causes auto xfer(s) to JPEG pixel fifo.
    add     Rpxinc1,Rpixel          ;now advance to next pixel
    move    Rpixtmp,*Rpixel,0       ;2
```

APPENDEX A-continued

```
       add     Rpxinc2,Rpixel
       move    Rpixtmp,*Rpixel,0      ;3
       add     Rpxinc1,Rpixel
       move    Rpixtmp,*Rpixel,0      ;4
       add     Rpxinc2,Rpixel
       move    Rpixtmp,*Rpixel,0      ;5
       add     Rpxinc1,Rpixel
       move    Rpixtmp,*Rpixel,0      ;6
       add     Rpxinc2,Rpixel
       move    Rpjxtmp,*Rpixel,0      ;7
       add     Rpxinc1,Rpixel
       move    Rpixtmp,*Rpixel,0      ;8
       add     Rpxinc2,Rpixel
       move    Rpixtmp,*Rpixel,0      ;9
       add     Rpxinc1,Rpixel
       move    Rpixtmp,*Rpixel,0      ;10
       add     Rpxinc2,Rpixel
       move    Rpixtmp,*Rpixel,0      ;11
       add     Rpxinc1,Rpixel
       move    Rpixtmp,*Rpixel,0      ;12
       add     Rpxinc2,Rpixel
       move    Rpixtmp,*Rpixel,0      ;13
       add     Rpxinc1,Rpixel
       move    Rpixtmp,*Rpixel,0      ;14
       add     Rpxinc2,Rpixel
       move    Rpixtmp,*Rpixel,0      ;15
       add     Rpxinc1,Rpixel
       move    Rpixtmp,*Rpixel,0      ;16
       add     Rpxinc2,Rpixel
       move    Rpixtmp,*Rpixel,0      ;17
       add     Rpxinc1,Rpixel
       move    Rpixtmp,*Rpixel,0      ;18
       add     Rpxinc2,Rpixel
       move    Rpixtmp,*Rpixel,0      ;19
       add     Rpxinc1,Rpixel
       move    Rpixtmp,*Rpixel,0      ;20
       add     Rpxinc2,Rpixel
       move    Rpixtmp,*Rpixel,0      ;21
       add     Rpxinc1,Rpixel
       move    Rpixtmp,*Rpixel,0      ;22
       add     Rpxinc2,Rpixel
       move    Rpixtmp,*Rpixel,0      ;23
       add     Rpxinc1,Rpixel
       move    Rpixtmp,*Rpixel,0      ;24
       add     Rpxinc2,Rpixel
       move    Rpixtmp,*Rpixel,0      ;25
       add     Rpxinc1,Rpixel
       move    Rpixtmp,*Rpixel,0      ;26
       add     Rpxinc2,Rpixel
       move    Rpixtmp,*Rpixel,0      ;27
       add     Rpxinc1,Rpixel
       move    Rpixtmp,*Rpixel,0      ;28
       add     Rpxinc2,Rpixel
       move    Rpixtmp,*Rpixel,0      ;29
       add     Rpxinc1,Rpixel
       move    Rpixtmp,*Rpixel,0      ;30
       add     Rpxinc2,Rpixel
       move    Rpixtmp,*Rpixel,0      ;31
       add     Rpxinc1,Rpixel
       move    Rpixtmp,*Rpixel,0      ;32
       add     Rpxinc2,Rpixel
       dsj     Rx,loop2               ;loop thru the line
       move    Rnext,Rpixel           ;load addr of next line to process
       dsj     Ry,lines               ;loop for next line
*      callr   syncodd                ;If we're in odd field, it took too long.
       jruc    frame
*
* The following routines sync the code to the incoming video fields.
* Note.  Since the status register is not synchronized with the 34010 instruction
*        clock, we must always check that we get the same reading twice in a row.
*
* Wait for start of next even field; check to make sure field is already ODD at entry.
* (If we enter here in an even field, it means an OVERRUN has occurred.)
syncevck:
s5     move    *Rstatp,Rtemp
       btst    0,Rtemp
       jrz     s5e1                   ; if even, go check a second time; fall thru if odd
s5o1   move    *Rstatp,Rtemp
       btst    0,Rtemp
```

APPENDEX A-continued

```
        jrz    s5e1              ; if even, go check a second time; fall thru if odd
s6      move   *Rstatp,Rtemp
        btst   0,Rtemp
        jrnz   s6                ; loop as long as it remains odd
        move   *Rstatp,Rtemp
        btst   0,Rtemp
        jrnz   s6                ; make sure we see it the same twice in a row
        rets                     ; normal successful return at start of an even field
* come here if we found an even value one time:
s5e1    move   *Rstatp,Rtemp     ; perform second test for even
        btst   0,Rtemp
        jrnz   s5o1              ; jump back if second check is okay (odd)
* else, fall thru
* At this point we have an overrun (two evens in a row), so count it
        move   @overrun,Rtemp,1
        addk   1,Rtemp           ; In the even field already . . . increase overrun count
        move   Rtemp,@overrun,1
s7      move   *Rstatp,Rtemp     ; We know it is even, so now we need to wait for odd
        btst   0,Rtemp
        jrz    s7
        move   *Rstatp,Rtemp
        btst   0,Rtemp
        jrz    s7
        jruc   s6
 .end
```

APPENDIX TS

22/24 EDL

TITLE: UNTITLED01
FCM: NON-DROP FRAME

| 001 | 050 | V | C | 04:11:23:21 | 04:11:37:19 | 01:00:00:00 | 01:00:13:28 |
|-----|-----|---|---|-------------|-------------|-------------|-------------|
| M2  | 050 |   |   | 030.0       | 04:11:23:21 |             |             |
| 002 | 050 | V | C | 04:03:14:26 | 04:03:20:01 | 01:00:13:28 | 01:00:19:03 |
| M2  | 050 |   |   | 030.0       | 04:03:14:26 |             |             |
| 003 | 050 | V | C | 04:11:37:19 | 04:11:55:29 | 01:00:19:03 | 01:00:37:13 |
| M2  | 050 |   |   | 030.0       | 04:11:37:19 |             |             |
| 004 | 050 | V | C | 04:04:51:01 | 04:04:56:13 | 01:00:37:13 | 01:00:42:24 |
| M2  | 050 |   |   | 030.0       | 04:04:51:01 |             |             |

TITLE: UNTITLED01
FCM: NON-DROP FRAME

| 001 | THEY_C | V | C | 04:11:23:21 | 04:11:37:19 | 01:00:00:00 | 01:00:13:28 |
|-----|--------|---|---|-------------|-------------|-------------|-------------|
| M2  | THEY_C |   |   | 030.0       | 04:11:23:21 |             |             |
| 002 | THEY_C | V | C | 04:03:14:26 | 04:03:20:01 | 01:00:13:28 | 01:00:19:03 |
| M2  | THEY_C |   |   | 030.0       | 04:03:14:26 |             |             |
| 003 | THEY_C | V | C | 04:11:37:19 | 04:11:55:29 | 01:00:19:03 | 01:00:37:13 |
| M2  | THEY_C |   |   | 030.0       | 04:11:37:19 |             |             |
| 004 | THEY_C | V | C | 04:04:51:01 | 04:04:56:13 | 01:00:37:13 | 01:00:42:24 |
| M2  | THEY_C |   |   | 030.0       | 04:04:51:01 |             |             |

Avid Technology, Inc.
Assemble list for edl file picture:

| Seq | first edge | last edge | length | cum | Camera Roll |
|-----|------------|-----------|--------|-----|-------------|
| 001 | OPTICAL Number 1 | FADE IN | 1+08 | 1+08 | EFFECT |
| 002 | end of optical 1 to | scene end | 4+02 | 5+10 | Flat #1 |
| 003 | KJ789876 −1370 +05 | −1372 +05 | 2+01 | 7+11 | Flat #1 |
| 004 | Scene start to | start of optical 2 | 1+04 | 8+15 | Flat #1 |
| 005 | OPTICAL Number 2 | DISSOLVE | 3+00 | 11+15 | EFFECT |
| 006 | end of optical 2 to | scene end | 7+05 | 19+04 | Flat #1 |
| 007 | KJ789876 −1236 +02 | −1243 +09 | 7+08 | 26+12 | Flat #1 |
| 008 | Scene start to | start of optical 3 | 2+04 | 29+00 | Flat #1 |
| 009 | OPTICAL Number 3 | FADE OUT | 1+08 | 30+08 | EFFECT |
| 010 | LEADER −0000 +00 | −0089 +15 | 90+00 | 120+08 | LEADER |
| 011 | OPTICAL Number 4 | FADE IN | 1+08 | 122+00 | EFFECT |
| 012 | end of optical 4 to | scene end | 1+08 | 123+08 | Flat #1 |
| 013 | KH123456 −5085 +05 | −5091 +10 | 6+06 | 129+14 | Flat #1 |
| 014 | K3789876 −1399 +05 | −1409 +08 | 10+04 | 140+02 | Flat #1 |
| 015 | LEADER −0000 +00 | −0003 +14 | 3+15 | 144+01 | LEADER |
| 016 | KH123456 −5132 +02 | −5142 +04 | 10+03 | 154+04 | Flat #1 |
| 017 | KH123456 −5053 +15 | −5057 +11 | 3+13 | 158+01 | Flat #1 |
| 018 | KH123456 −5083 +00 | −5083 +13 | 0+14 | 158+15 | Flat #1 |

-continued

APPENDIX TS

| | | | | | | |
|---|---|---|---|---|---|---|
| 019 | KJ789876 −1244 +09 | −1248 +09 | | 4+01 | 163+00 | Flat #1 |
| 020 | KJ789876 −1453 +07 | −1464 +11 | | 11+05 | 174+05 | Flat #1 |
| { 021 | Scene start to | start of optical 5 | | 6+02 | 180+07 | Flat #1 |
| { 022 | OPTICAL Number 5 | FADE OUT | | 1+08 | 181+15 | EFFECT |

Avid Technology, Inc.
Assemble Pull List (scene pull in assemble order) for edl file picture:

| Tapename | Segment Name | first edge | last edge | length | scene |
|---|---|---|---|---|---|
| NAB91COMPILATIONTAPE | Flat #1 | KJ789876 −1441 +15 | −1575 | +03 | 133+05 |
| NAB91COMPILATIONTAPE | Flat #1 | KJ789876 −1368 +13 | −1393 | +07 | 24+11 |
| NAB91COMPILATIONTAPE | Flat #1 | KH123456 −5019 +11 | −5050 | +04 | 30+10 |
| NAB91COMPILATIONTAPE | Flat #1 | KJ789876 −1327 +03 | −1368 | +12 | 41+10 |
| NAB91CCMPILATIONTAPE | Flat #1 | KJ789876 −1234 +00 | −1300 | +00 | 66+01 |
| NAB91CCMPILATIONTAPE | Flat #1 | KH123456 −5050 +05 | −5082 | +15 | 32+11 |
| NAB91COMPILATIONTAPE | Flat #1 | KJ789876 −1300 +01 | −1327 | +02 | 27+02 |
| NAB91COMPILATIONTAPE | Flat #1 | KH123456 −5083 +00 | −5128 | +01 | 45+02 |
| NAB91COMPILATIONTAPE | Flat #1 | KJ789876 −1393 +08 | −1441 | +14 | 48+07 |
| NAB91COMPILATIONTAPE | Flat #1 | KH123456 −5128 +02 | −5172 | +05 | 44+04 |

Avid Technology, Inc.
Pull list for edl file picture:

| Seq | first edge | last edge | roll Lab Roll | length | scene | take |
|---|---|---|---|---|---|---|
| 004 | KH123456 −5020 +11 | see OPTICAL 2 | Flat #1 | 1+04 | 1 | 2 |
| 008* | KH123456 −5052 +06 | see OPTICAL 3 | Flat #1 | 2+04 | 2 | 1 |
| 017* | KH123456 −5053 +15 | −5057 +11 | Flat #1 | 3+13 | 2 | 1 |
| 018 | KH123456 −5083 +00 | −5083 +13 | Flat #1 | 0+14 | 3 | 2 |
| 013 | KH123456 −5085 +05 | −5091 +10 | Flat #1 | 6+06 | 3 | 2 |
| 016 | KH123456 −5132 +02 | −5142 +04 | Flat #1 | 10+03 | 3a | 1 |
| 007 | KJ789876 −1236 +02 | −1243 +09 | Flat #1 | 7+08 | 6 | 1 |
| 019 | KJ789876 −1244 +09 | −1248 +09 | Flat #1 | 4+01 | 6 | 1 |
| 012 | KJ789876 −1305 +03 | see OPTICAL 4 | Flat #1 | 1+08 | 7 | 1 |
| 006 | KJ789876 −1332 +01 | see OPTICAL 2 | Flat #1 | 7+05 | 7 | 2 |
| 003 | KJ789876 −1370 +05 | −1372 +05 | Flat #1 | 2+01 | 9 | 1 |
| 014 | KJ789876 −1399 +05 | −1409 +08 | Flat #1 | 10+04 | 9 | 3 |
| 021 | KJ789876 −1412 +08 | see OPTICAL 5 | Flat #1 | 6+02 | 9 | 3 |
| 002 | KJ789876 −1447 +03 | see OPTICAL 1 | Flat #1 | 4+02 | 10 | 5 |
| 020 | KJ789876 −1453 +07 | −1464 +11 | Flat #1 | 11+05 | 10 | 5 |
| 010 | LEADER −0000 +00 | −0089 +15 | 35 mm LEADER | 90+00 | | |
| 015 | LEADER −0000 +00 | −0003 +14 | 35 mm LEADER | 3+15 | | |
| 001 | OPTICAL Number 1 | FADE IN | EFFECT | 1+08 | | |
| 005 | OPTICAL Number 2 | DISSOLVE | EFFECT | 3+00 | | |
| 009* | OPTICAL Number 3 | FADE OUT | EFFECT | 1+08 | | |
| 011 | OPTICAL Number 4 | FADE IN | EFFECT | 1+08 | | |
| 022 | OPTICAL Number 5 | FADE OUT | EFFECT | 1+08 | | |

Avid Technology, Inc.
Scene Pull List for edl file picture:

| Tapename | Lab Roll | first edge | last edge | length | scene |
|---|---|---|---|---|---|
| NAB91COMPILATIONTAPE | Flat #1 | KH123456 −5019 +11 | −5050 | +04 | 30+10 |
| NAB91COMPILATIONTAPE | Flat #1 | KH123456 −5050 +05 | −5082 | +15 | 32+11 |
| NAB91CCMPILATIONTAPE | Flat #1 | KH123456 −5083 +00 | −5128 | +01 | 45+02 |
| NAB91COMPILATIONTAPE | Flat #1 | KH123456 −5128 +02 | −5172 | +05 | 44+04 |
| NAB91COMPILATIONTAPE | Flat #1 | KJ789876 −1234 +00 | −1300 | +00 | 66+01 |
| NAB91COMPILATIONTAPE | Flat #1 | KJ789876 −1300 +01 | −1327 | +02 | 27+02 |
| NAB91COMFILATIONTAPE | Flat #1 | KJ789876 −1327 +03 | −1368 | +12 | 41+10 |
| NAB91COMPILATIONTAPE | Flat #1 | KJ789876 −1368 +13 | −1393 | +07 | 24+11 |
| NAB91COMPILATIONTAPE | Flat #1 | KJ789876 −1393 +08 | −1441 | +14 | 48+07 |
| NAB91COMPILATIONTAPE | Flat #1 | KJ789876 −1441 +15 | −1575 | +03 | 133+05 |

Avid Technology, Inc.
Negative Dupe list for edi file picture:

| Seq | | first edge last edge | dupe negative start dupe negative end | scene take | roll |
|---|---|---|---|---|---|
| 008 | KH123456 | −5052 +06 | KH123456 −5052 +06 | 2 | Flat #1 |
| | | −5054 +09 | KH123456 −5057 +11 | 1 | |
| 017 | KH123456 | −5053 +15 | | 2 | Flat #1 |
| | | −5057 +11 | | 1 | |
| 009 | | OPTICAL Number 3 | KH123456 −05054 +10 | 2 | Flat #1 |
| | | | KH123456 −05056 +07 | 1 | |

Avid Technology, Inc.
Optical effects list for EDL file picture: (5 effects)
Num: 001          Type:Fade-in          Length: 1+08 (24 frames)

-continued

APPENDIX TS

| | | |
|---|---|---|
| Cut: 001 | | |
| Edl: 001 | OUT: | IN: |
| | Roll: BLACK | Roll: Flat #1 |
| | Scene: | Scene: 10 |
| | Take: | Take: 5 |
| Scene start: | BLACK | |
| FADE start: | BLACK | KJ789876 −01445 +11 |
| FADE center: | BLACK | KJ789876 −01446 +06 |
| FADE end: | BLACK | KJ789876 −01447 +02 |
| Scene end: | | KJ789876 −01451 +05 |

| | | |
|---|---|---|
| Num: 002 | Type: Dissolve | Length: 3+00 (48 frames) |
| Cut: 005 | | |
| Edl: 004 | OUT: | IN: |
| | Roll: Flat #1 | Roll: Flat #1 |
| | Scene: 1 | Scene: 7 |
| | Take: 2 | Take: 2 |
| Scene start: | KH123456 −05020 +11 | |
| DSLV start: | KH123456 −05021 +15 | KJ789876 −01329 +01 |
| DSLV center: | KH123456 −05023 +06 | KJ789876 −01330 +08 |
| DSLV end: | KH123456 −05024 +14 | KJ789876 −01332 +00 |
| Scene end: | | KJ789876 −01339 +05 |

| | | |
|---|---|---|
| Num: 003 | Type: Fade-out | Length: 1+14 (30 frames) |
| Cut: 009 | | |
| Edl: 007 | OUT: | IN: |
| | Roll: Flat #1 | Roll: BLACK |
| | Scene: 2 | Scene: |
| | Take: 1 | Take: |
| Scene start: | KH123456 −05052 +06 | |
| FADE start: | KH123456 −05054 +10 | BLACK |
| FADE center: | KH123456 −05055 +08 | BLACK |
| FADE end: | KH123456 −05056 +07 | BLACK |
| Scene end: | | BLACK |

| | | |
|---|---|---|
| Num: 004 | Type: Fade-in | Length: 1+08 (24 frames) |
| Cut: 011 | | |
| Edl: 008 | OUT: | IN: |
| | Roll: BLACK | Roll: Flat #1 |
| | Scene: | Scene: 7 |
| | Take: | Take: 1 |
| Scene start: | BLACK | |
| FADE start: | BLACK | KJ789876 −01303 +11 |
| FADE center: | BLACK | KJ789876 −01304 +06 |
| FADE end: | BLACK | KJ789876 −01305 +02 |
| Scene end: | | KJ789876 −01306 +10 |

| | | |
|---|---|---|
| Num: 005 | Type: Fade-out | Length: 1+14 (30 frames) |
| Cut: 022 | | |
| Edi: 017 | OUT: | IN: |
| | Roll: Flat #1 | Roll: BLACK |
| | Scene: 9 | Scene: |
| | Take: 3 | Take: |
| Scene start: | KJ789876 −01412 +08 | |
| FADE start: | KJ789876 −01413 +10 | BLACK |
| FADE center: | KJ789876 −01419 +08 | BLACK |
| FADE end: | K3789876 −01420 +07 | BLACK |
| Scene end: | | BLACK |

What is claimed is:

1. A computer-based system for non-linear editing of a program from a source having a temporal resolution corresponding to a playback rate of 24 frames per second, comprising:

a random access computer readable medium on which a plurality of sequences of digital images are stored corresponding to the source and having a one-to-one correspondence with the playback rate of 24 frames per second;

nonlinear editing means, responsive to user input, for specifying a sequence of segments of said plurality of sequences of digital images store on the random access computer readable medium, wherein a start location and a stop location of each segment in its corresponding sequence of digital images may be at any frame boundary and are at a temporal resolution corresponding to the playback rate of 24 frames per second; and means for generating a representation of the program from the sequence of segments of the sequences of digital images.

2. The computer-based system of claim 1, further including a means for synchronizing an audio soundtrack with the representation of the program.

3. The computer-based system of claim 2, wherein the synchronized representation of the program and the audio soundtrack is a television signal.

4. The computer-based system of claim 3, wherein the means for generating includes a means for generating redundant video fields within the television signal so that the television signal can be displayed at a frame rate of 29.97 frames per second.

5. The computer-based system of claim 3, further comprising a display that displays the television signal.

6. The computer-based system of claim 2, wherein the audio soundtrack corresponds to film having a frame rate of 24 frames per second and the means for synchronizing includes a means for slowing down the audio soundtrack from the rate corresponding to a film rate of 24 frames per second to a rate corresponding to a film rate of 23.976 frames per second.

7. The computer-based system of claim 2, wherein the audio soundtrack is a digitized representation, and further including a display that displays the representation of the program and the synchronized digitized representation of the audio soundtrack.

8. The computer-based system of claim 7, wherein the representation of the program and the synchronized digitized representation of the audio soundtrack are displayed at a frame rate of 24 frames per second.

9. The computer-based system of claim 7, wherein the display includes a metric that displays a current location of an image of the representation of the program in any of a time code format, a key code format and a film footage format.

10. The computer-based system of claim 1, further including:
a bin containing information about the start location and the stop location of each segment of the sequence of segments of the sequences of digital images in any of a time code format, a key code format and a film footage format; and
means for updating the bin with the start location and the stop location of each segment in response to the specifying of the sequence of segments of the sequence of digital images.

11. The computer-based system of claim 1, wherein the representation of the program is a film cut list that identifies cuts to be made to film so that the film can be edited to correspond to the sequence of segments of the sequences of digital images.

12. The computer-based system of claim 11, further comprising a means for editing the film to correspond to the sequence of segments of the sequences of digital images based upon the film cut list.

13. The computer-based system of claim 1, wherein the representation of the program is an edit decision list that describes edits to be made to a video sequence corresponding to the source and having a frame rate of 29.97 frames per second, so that the video sequence can be edited to correspond to the sequence of segments of the sequences of digital images.

14. The computer-based system of claim 1, further comprising means, operative in response to data indicative of redundant fields within image data corresponding to film and having a frame rate of 29.97 frames per second, for converting the image data to the sequences of digital images.

15. The computer-based system of claim 14, further comprising means for converting the film to the image data having the frame rate of 29.97 frames per second and the data indicative of the redundant fields within the image data.

16. The computer-based system of claim 15, wherein the data indicative of the redundant fields within the image data includes a film transfer log having a synchronization point between the film and the image data and data indicative of where in a pull-down sequence the pull-down sequence was used to generate the image data.

17. A method for non-linear editing of a program from a source having a temporal resolution corresponding to a playback rate of 24 frames per second, the method comprising:
storing a plurality of sequences of digital images in a random-access computer readable medium, wherein each sequence of digital images has a one-to-one correspondence with the playback rate of 24 frames per second;
nonlinear editing of a sequence of segments of said plurality of sequences of digital images stored on the random access computer readable medium, wherein a start location and a stop location of each segment in its corresponding sequence of digital images may be at any frame boundary and are at a temporal resolution corresponding to the playback rate of 24 frames per second; and
generating a representation of the program from the sequence of segments of the sequences of digital images.

18. The method of claim 17, wherein the step of specifying includes editing a digitized soundtrack corresponding to the sequences of segments of the sequence digital images so that the digitized soundtrack is in synchronization with the sequence of segments of the sequences of digital images.

19. The method of claim 18, wherein the step of generating the representation of the program includes generating a television signal including a synchronized soundtrack.

20. The method of claim 18, wherein the step of synchronizing includes slowing down the digitized soundtrack from a rate corresponding to a film rate of 24 frames per second to a rate corresponding to a film rate of 23.976 frames per second.

21. The method of claim 19, wherein the step of generating the representation of the program as the television signal includes adding redundant fields within the television signal so that the television signal can be displayed at a frame rate of 29.97 frames per second.

22. The method of claim 19, further comprising the step of displaying the television signal.

23. The method as claimed in claim 18, further comprising the step of displaying the representation of the program in synchronization with the digitized soundtrack.

24. The method as claimed in claim 23, wherein the representation of the program and the synchronized digitized soundtrack are displayed at a frame rate of 24 frames per second.

25. The method of claim 23, wherein the step of displaying the representation of the program includes displaying a metric tracking a current location of an image of the representation of the program in any of a time code format, a key code format and a film footage format.

26. The method of claim 17, wherein the step of specifying the sequence of segments of the sequences of digital images includes updating a bin containing information identifying the start location and the stop location of the segments of the sequences of digital video images, the information being in any of a time code format, a key code format and a film footage format.

27. The method of claim 17, wherein the step of generating the representation of the program includes the step of generating a film cut list that describes cuts to be made to film so that the film can be edited to correspond to the sequence of segments of the sequences of digital images.

28. The method of claim 27, further comprising the step of cutting the film according to the film cut list to correspond to the sequence of segments of the sequences of digital images.

29. The method of claim 17, wherein the step of generating the representation of the program includes the step of generating an edit decision list that describes edits to be made to image data corresponding to film and having a frame rate of 29.97 frames per second, so that the image data can be edited to correspond to the sequence of segments of the sequences of digital images.

30. The method of claim 17, further comprising the step of digitizing image data representing film having a frame rate of 29.97 frames per second, using data indicative of redundant fields within the image data, so as to generate the sequences of digital images having a frame rate of 24 frames per second.

31. The method of claim 30, further comprising the step of converting the film to the image data including the redundant fields and the data indicative of the redundant fields.

32. The method of claim 31, wherein the step of converting the film to the image data includes generating a film transfer log having a synchronization point between the film and the image data and data indicative of where in a pull-down sequence the pull-down sequence was used to generate the image data.

33. A program made by the method of claim 17.

34. A computer-based system for non-linear editing of a program from a source having a temporal resolution corresponding to a playback rate of 24 frames per second, comprising:
a random access computer readable medium on which at least one sequence of digital images is stored corresponding to the source and having a one-to-one correspondence with the playback rate of 24 frames per second, wherein the digital images have a first order;
nonlinear editing means, responsive to user input, for specifying a sequence of segments of the at least one sequence of digital images stored on the random access computer readable medium, wherein a start location and a stop location of each segment in its corresponding sequence of digital images may be at any frame boundary and are at a temporal resolution corresponding to the playback rate of 24 frames per second, wherein the digital images in the sequence of segments have a second order different from the first order; and
means for generating a representation of the program from the sequence of segments of the at least one sequence of digital images.

35. The computer-based system of claim 34, further including a means for synchronizing an audio soundtrack with the representation of the program.

36. The computer-based system of claim 35, wherein the synchronized representation of the program and the audio soundtrack is a television signal.

37. The computer-based system of claim 36, wherein the means for generating includes a means for generating redundant video fields within the television signal so that the television signal can be displayed at a frame rate of 29.97 frames per second.

38. The computer-based system of claim 36, further comprising a display that displays the television signal.

39. The computer-based system of claim 35, wherein the audio soundtrack corresponds to film having a frame rate of 24 frames per second and the means for synchronizing includes a means for slowing down the audio soundtrack from the rate corresponding to a film rate of 24 frames per second to a rate corresponding to a film rate of 23.976 frames per second.

40. The computer-based system of claim 35, wherein the audio soundtrack is a digitized representation, and further including a display that displays the representation of the program and the synchronized digitized representation of the audio soundtrack.

41. The computer-based system of claim 40, wherein the representation of the program and the synchronized digitized representation of the audio soundtrack are displayed at a frame rate of 24 frames per second.

42. The computer-based system of claim 40, wherein the display includes a metric that displays a current location of an image of the representation of the program in any of a time code format, a key code format and a film footage format.

43. The computer-based system of claim 34, further including:
a bin containing information about the start location and the stop location of each segment of the sequence of segments of the sequence of digital images in any of a time code format, a key code format and a film footage format; and
means for updating the bin with the start location and the stop location of each segment in response to specification of the sequence of segments of the sequence of digital images.

44. The computer-based system of claim 34, wherein the representation of the program is a film cut list that identifies cuts to be made to the film so that film can be edited to correspond to the sequence of segments of the sequence of digital images.

45. The computer-based system of claim 44, further comprising a means for editing the film to correspond to the sequence of segments of the sequence of digital images based upon the film cut list.

46. The computer-based system of claim 34, wherein the representation of the program is an edit decision list that describes edits to be made to a video sequence corresponding to film and having a frame rate of 29.97 frames per second, so that the video sequence can be edited to correspond to the sequence of segments of the sequence of digital images.

47. The computer-based system of claim 34, further comprising means, operative in response to data indicative of redundant fields within image data corresponding to film and having a frame rate of 29.97 frames per second, for converting the data to the sequence of digital images having a frame rate of 24 frames per second.

48. The computer-based system of claim 47, further comprising means for converting the film to the image data having the frame rate of 29.97 frames per second and the data indicative of the redundant fields within the image data.

49. The computer-based system of claim 48, wherein the data indicative of the redundant fields within the image data includes a film transfer log having a synchronization point between the film and the image data and data indicative of where in a pull-down sequence the pull-down sequence was used to generate the image data.

50. A program having a playback rate of 24 frames per second, made by a nonlinear process comprising:
storing a plurality of sequences of digital images corresponding to a source in a random access computer readable medium, the sequence of digital images having a one-to-one correspondence with the playback rate of 24 frames per second;

nonlinear editing of a sequence of segments of said plurality of sequences of digital images stored in The random access computer readable medium, wherein a start location and a stop location of each segment in its corresponding sequence of digital images may be at any frame boundary and is at the temporal resolution of the playback rate of 24 frames per second; and generating a representation of the program from the sequence of segments of the sequences of digital images.

51. The program of claim 50, wherein the generated representation of the program is a cut list.

52. The program of claim 51, wherein the method further comprises the step of making the program by cutting film according to the cut list to correspond to the sequence of segments.

\* \* \* \* \*

UNITED STATES PATENT AND TRADEMARK OFFICE
CERTIFICATE OF CORRECTION

PATENT NO.   : 5,930,445
DATED        : July 27, 1999
INVENTOR(S)  : Eric C. Peters; Patrick D. O'Connor; Michael E. Phillips It is certified that error appears in the above-identified patent and that said Letters Patent is hereby corrected as shown below:

Title page, Page 2,
Under OTHER PUBLICATIONS, replace
"Becker, Stanley D., Stimultaneous Release on Film and Tape" with -- Becker, Stanley S., "Simultaneous Release on Film and Tape --

Column 1,
Line 29, replace "he rein" with -- herein --.

Column 3,
Line 33, replace "or" with -- for --.

Column 4,
Line 47, replace "creat" with -- create --.
Line 50, replace "telecin" with -- telecine --.

Column 5,
Line 2, replace "pull down" with -- pulldown --.
Line 52, replace "hat" with -- that --.

Column 6,
Line 40, replace "FIG. 1." with -- FIG. 1, --.

Column 7,
Line 41, after "system" insert -- , --.

Column 9,
Line 14, between "spliced" and "together" delete "to".

Column 10,
Line 15, between "and" and "edit" insert -- a --.

Replace entirety of "Appendix A" (sic) with Appendix A attached hereto.

Replace entirety of "Appendix TS" (sic) with Appendix B attached hereto.

Column 28,
Line 59, replace "store" with -- stored --.

UNITED STATES PATENT AND TRADEMARK OFFICE
CERTIFICATE OF CORRECTION

PATENT NO.   : 5,930,445
DATED        : July 27, 1999
INVENTOR(S)  : Eric C. Peters; Patrick D. O'Connor; Michael E. Phillips It is certified that error appears in the above-identified patent and that said Letters Patent is hereby corrected as shown below:

Column 30,
Line 7, delete "where in" and after "sequence" (first occurrence) insert -- wherein --.
Line 31, replace "sequences" with -- sequence --.
Line 31, replace "sequence digital" with -- sequences of digital --.

Column 31,
Line 29, delete "where in".
Line 30, after "sequence" (first occurrence) insert -- wherein --.

Column 32,
Line 25, after "the" insert -- at least one --.
Line 30, after "the" (second occurrence) insert -- at least one --.
Line 35, after "the" (second occurrence) insert -- at least one --.
Line 39, after "the" insert -- at least one --.
Line 46, after "the" (second occurrence) insert -- at least one --.
Line 52, after "the" (second occurrence) insert -- at least one --.
Line 62, delete "where in" and after "sequence" (first occurrence) insert -- wherein --.

Column 33,
Line 5, replace "The" with -- the --.
Line 6, replace "readabIe" with -- readable --.

Signed and Sealed this

Twenty-fifth Day of September, 2001

*Attest:*

NICHOLAS P. GODICI
*Attesting Officer*   Acting Director of the United States Patent and Trademark Office